(12) United States Patent
Itou et al.

(10) Patent No.: US 10,899,381 B2
(45) Date of Patent: Jan. 26, 2021

(54) STEERING CONTROL DEVICE AND CONTROL METHOD FOR STEERING CONTROL DEVICE

(71) Applicant: Hitachi Automotive Systems, Ltd., Ibaraki (JP)

(72) Inventors: Takahiro Itou, Tokyo (JP); Kazuya Yamano, Hitachinaka (JP); Yasuhito Nakakuki, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 102 days.

(21) Appl. No.: 16/302,561

(22) PCT Filed: Mar. 22, 2017

(86) PCT No.: PCT/JP2017/011337
§ 371 (c)(1),
(2) Date: Nov. 16, 2018

(87) PCT Pub. No.: WO2017/199575
PCT Pub. Date: Nov. 23, 2017

(65) Prior Publication Data
US 2019/0202494 A1 Jul. 4, 2019

(30) Foreign Application Priority Data
May 19, 2016 (JP) ................. 2016-100216

(51) Int. Cl.
*B62D 5/04* (2006.01)
*B62D 15/02* (2006.01)
(Continued)

(52) U.S. Cl.
CPC .............. *B62D 5/046* (2013.01); *B60W 40/08* (2013.01); *B60W 50/08* (2013.01); *B62D 1/286* (2013.01);
(Continued)

(58) Field of Classification Search
CPC ...... B62D 5/046; B62D 15/025; B62D 1/286; B62D 15/0285; B60W 50/08; B60W 40/08; B60W 60/0057
See application file for complete search history.

(56) References Cited

U.S. PATENT DOCUMENTS

| 5,774,069 A | 6/1998 | Tanala et al. |
| 5,925,082 A | 7/1999 | Shimizu |
| (Continued) | | |

FOREIGN PATENT DOCUMENTS

| JP | H04-055168 A | 2/1992 |
| JP | H09-161196 A | 6/1997 |
| (Continued) | | |

OTHER PUBLICATIONS

Japanese Office Action issued in corresponding Jananese Application No. 2018-518130 dated Dec. 17, 2019 with machine translation, eleven (11) pages.

(Continued)

*Primary Examiner* — Rodney A Butler
(74) *Attorney, Agent, or Firm* — Foley & Lardner LLP

(57) ABSTRACT

A steering device is provided to perform a safe transition from an automatic driving mode to a manual driving mode when necessary. When it is determined necessary to transition from the automatic driving mode to the manual driving mode during the automatic driving mode, a transition period before an end time point of the automatic driving mode is set, a driving operation reliability indicative of whether or not it is possible to perform the transition is determined, and the transition when it is determined that it is possible to perform the transition to the manual driving mode during the automatic driving mode. Consequently, the transition can be controlled so that transition is not performed instantly, such as, for example, in a case where a driver is not driving during (Continued)

the automatic driving mode and is not accustomed to manual driving.

16 Claims, 14 Drawing Sheets

(51) Int. Cl.
 *B60W 40/08* (2012.01)
 *B60W 50/08* (2020.01)
 *B62D 1/28* (2006.01)
(52) U.S. Cl.
 CPC ....... *B62D 15/025* (2013.01); *B62D 15/0285* (2013.01)

(56) References Cited

U.S. PATENT DOCUMENTS

| | | | |
|---|---|---|---|
| 6,050,359 A * | 4/2000 | Mouri | B62D 1/286 180/415 |
| 8,060,305 B2 | 11/2011 | Kimura et al. | |
| 8,521,414 B2 | 8/2013 | Urai et al. | |
| 2003/0144801 A1 | 7/2003 | Braeuchle et al. | |
| 2016/0033964 A1 | 2/2016 | Sato et al. | |
| 2017/0008557 A1 | 1/2017 | Mitsumoto | |
| 2017/0057542 A1* | 3/2017 | Kim | B62D 15/025 |
| 2018/0029633 A1* | 2/2018 | Tsubaki | B62D 1/286 |

FOREIGN PATENT DOCUMENTS

| | | |
|---|---|---|
| JP | H09-216567 A | 8/1997 |
| JP | H10-329575 A | 12/1998 |
| JP | 2004-518151 A | 6/2004 |
| JP | 2008-006921 A | 1/2008 |
| JP | 2015-137085 A | 7/2015 |
| JP | 2016-034782 A | 3/2016 |
| WO | WO-2008/126474 A1 | 10/2008 |

OTHER PUBLICATIONS

International Search Report dated May 30, 2017 in PCT/JP2017/011337.

* cited by examiner

[FIG. 1]
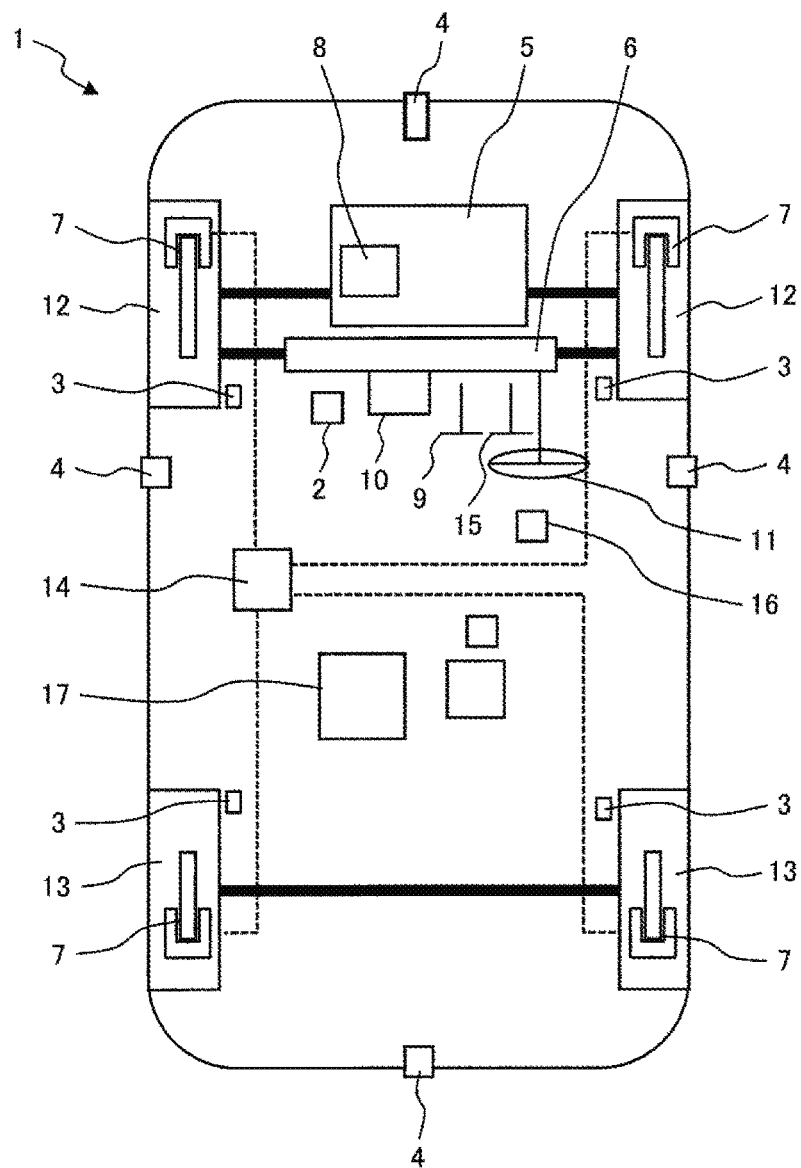

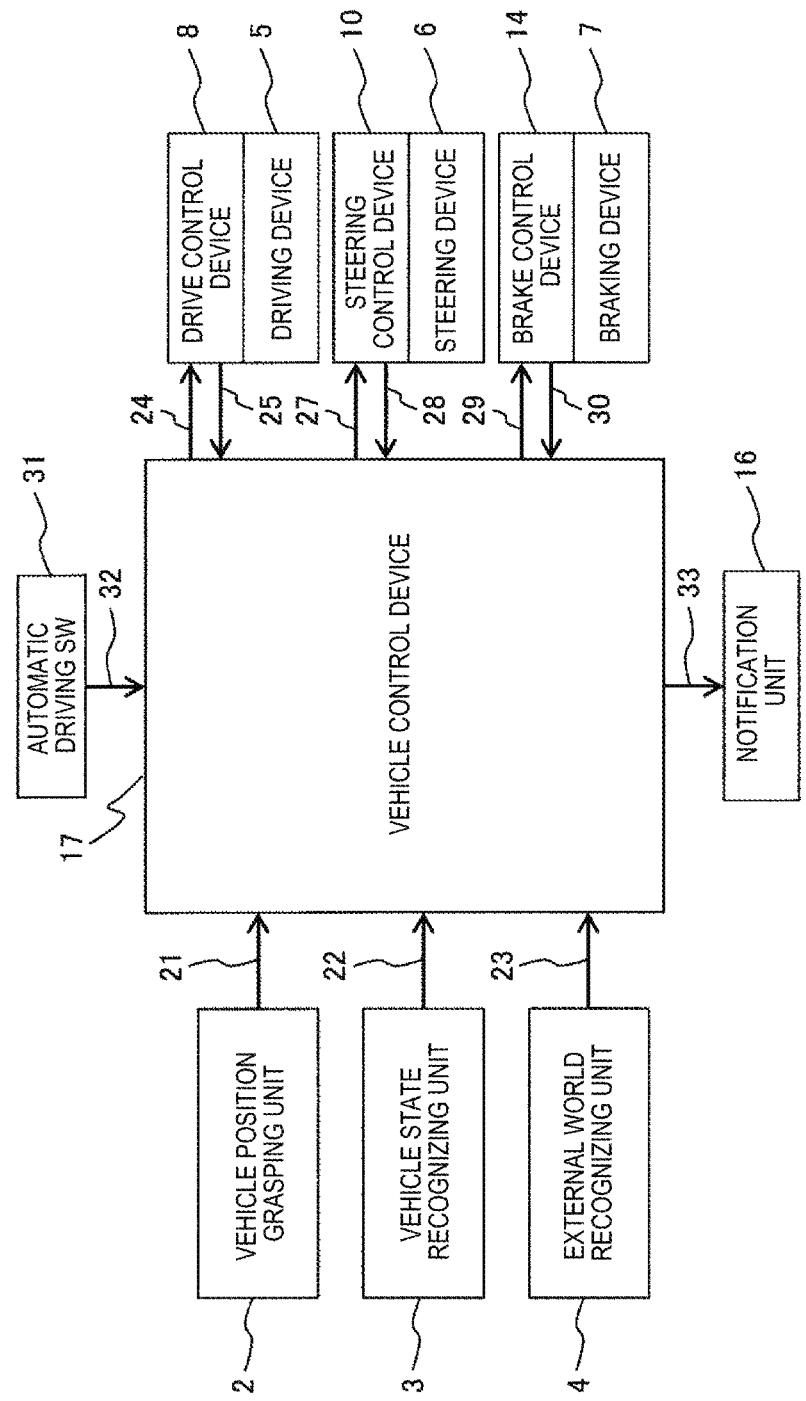
[FIG. 2]

[FIG. 3]
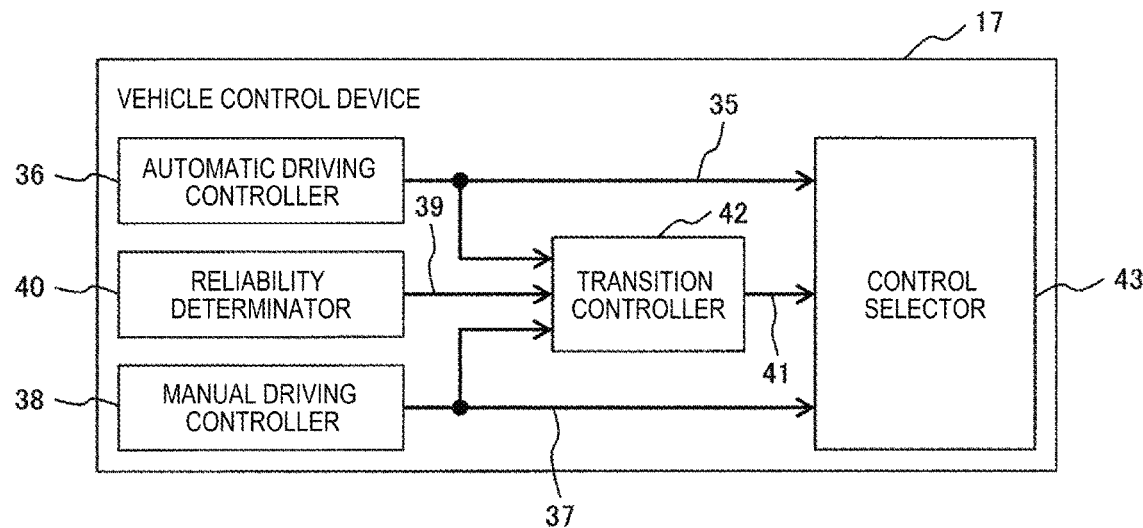
[FIG. 4]
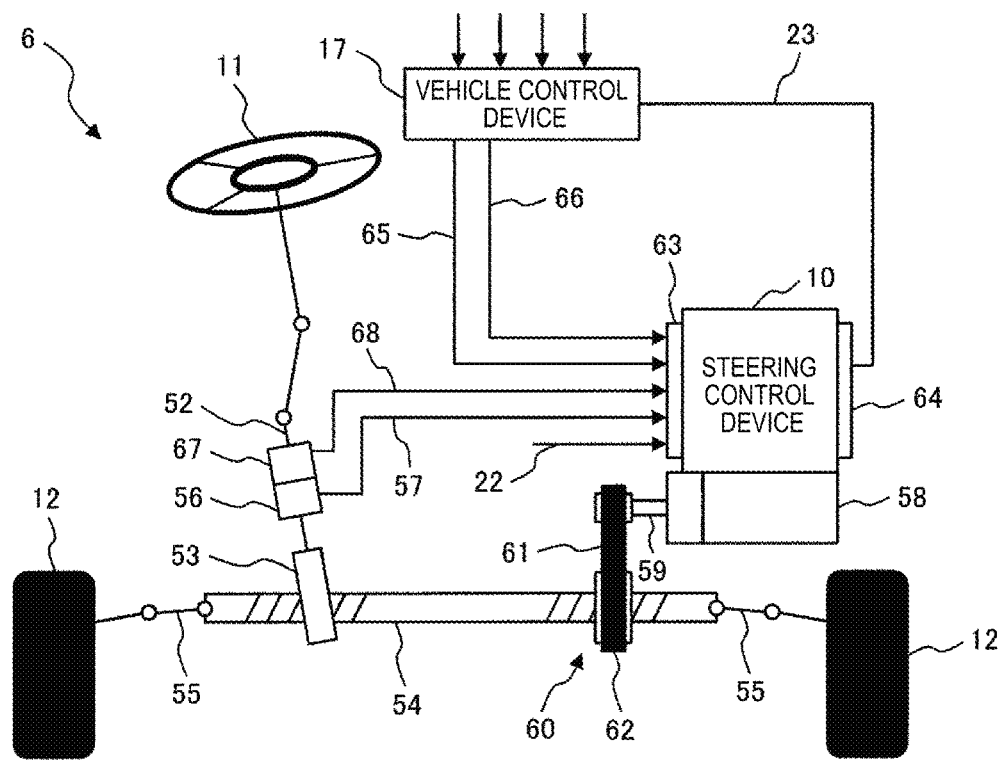

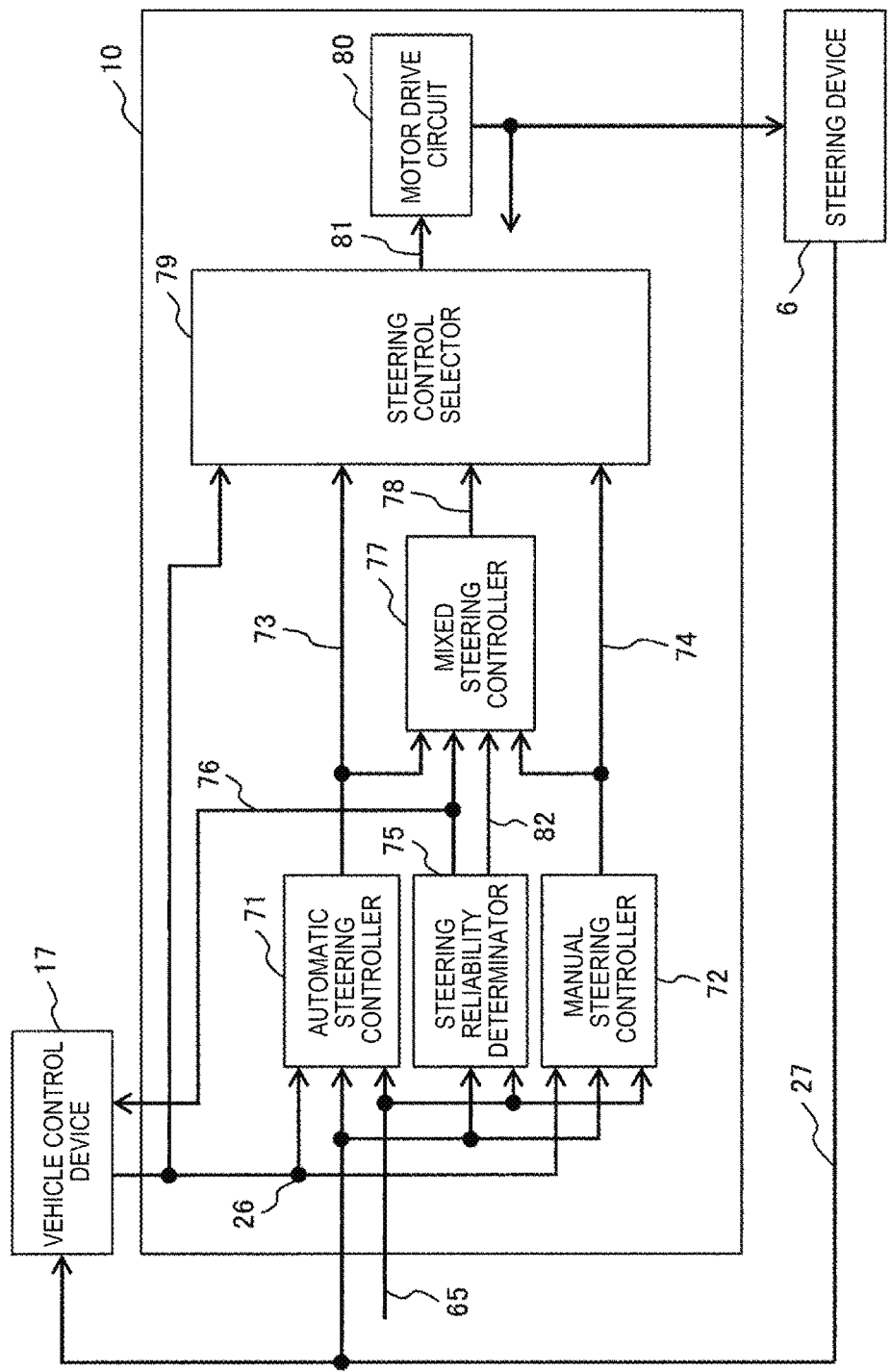
[FIG. 5]

[FIG. 6]
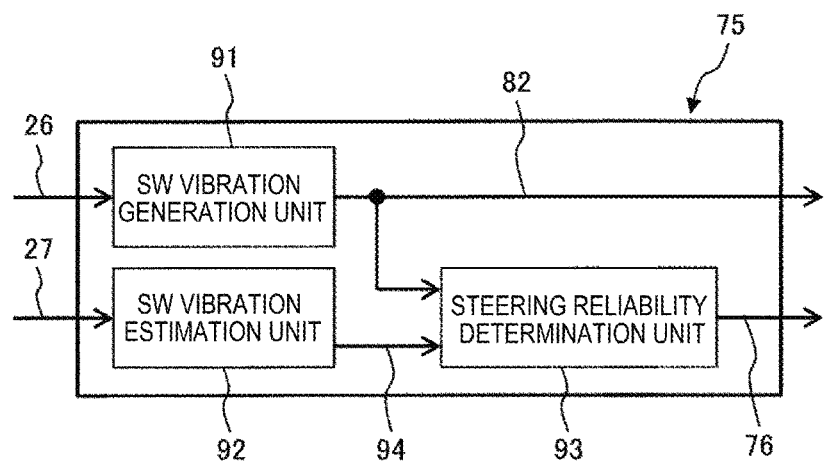

[FIG. 7]
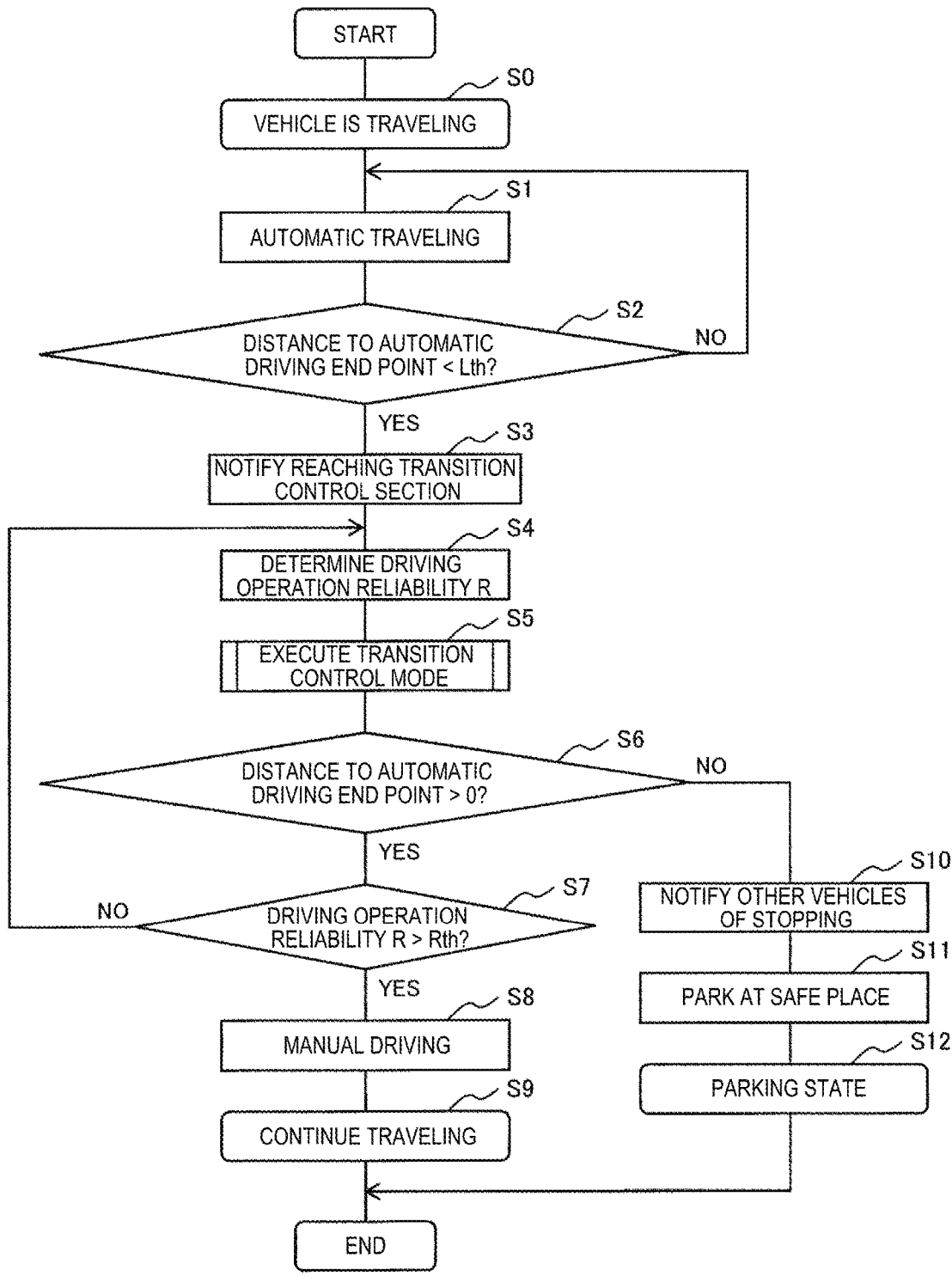

[FIG. 8A]
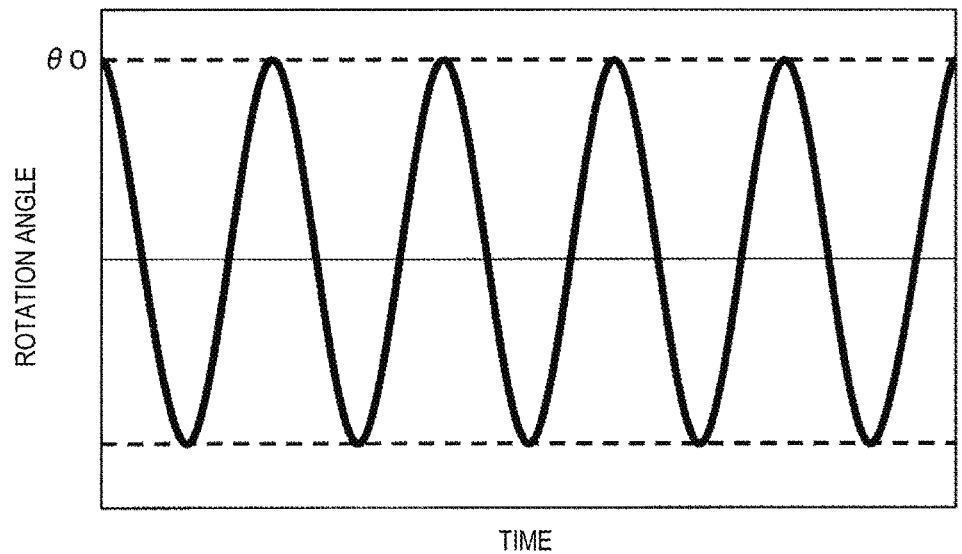
[FIG. 8B]
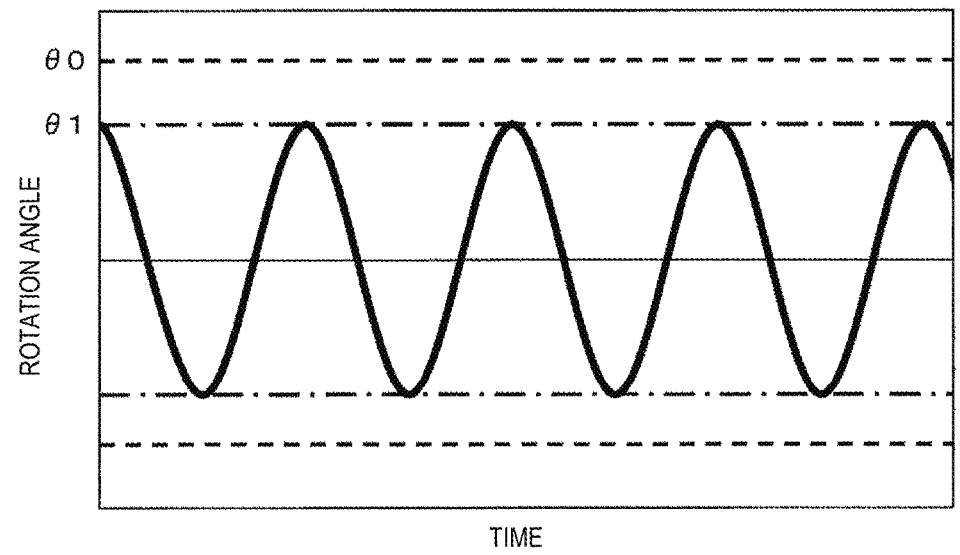

[FIG. 9]
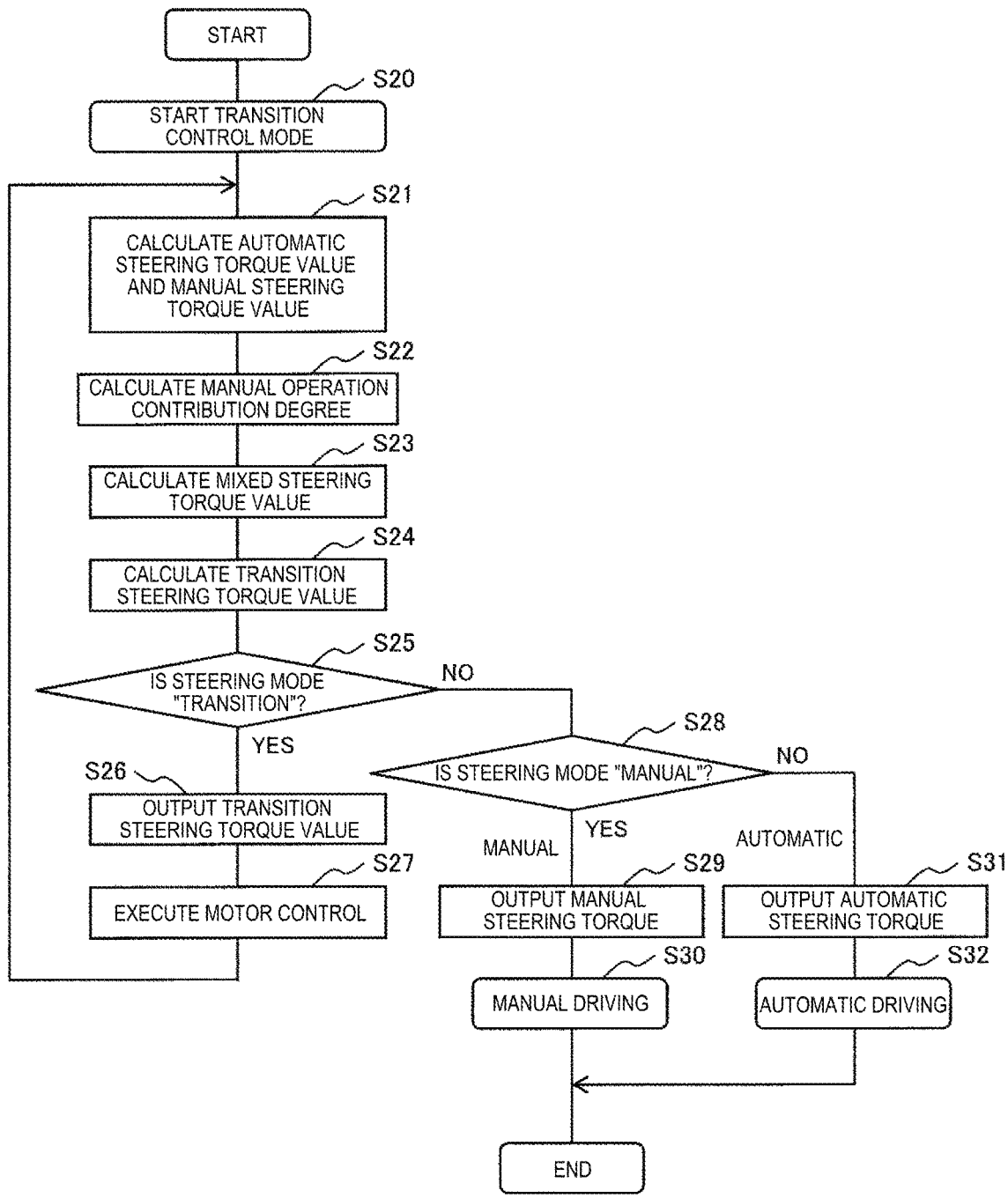

[FIG. 10]
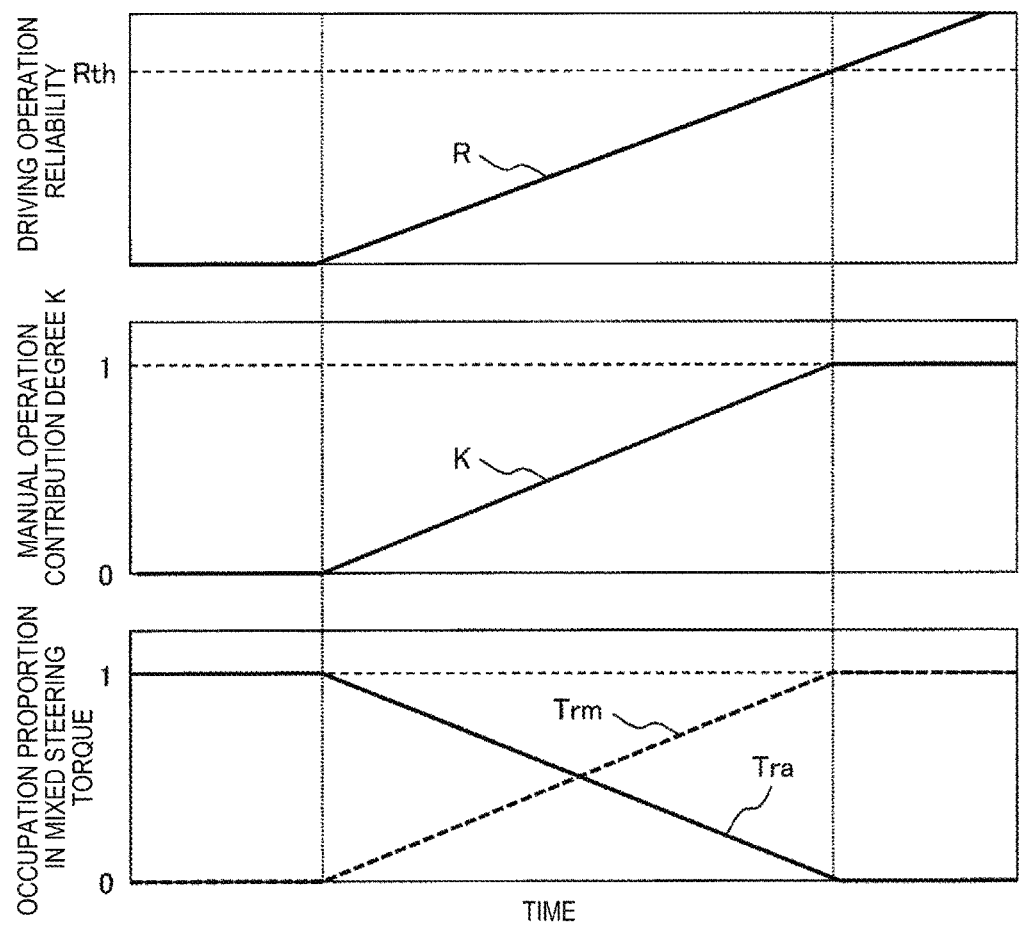

[FIG. 11]
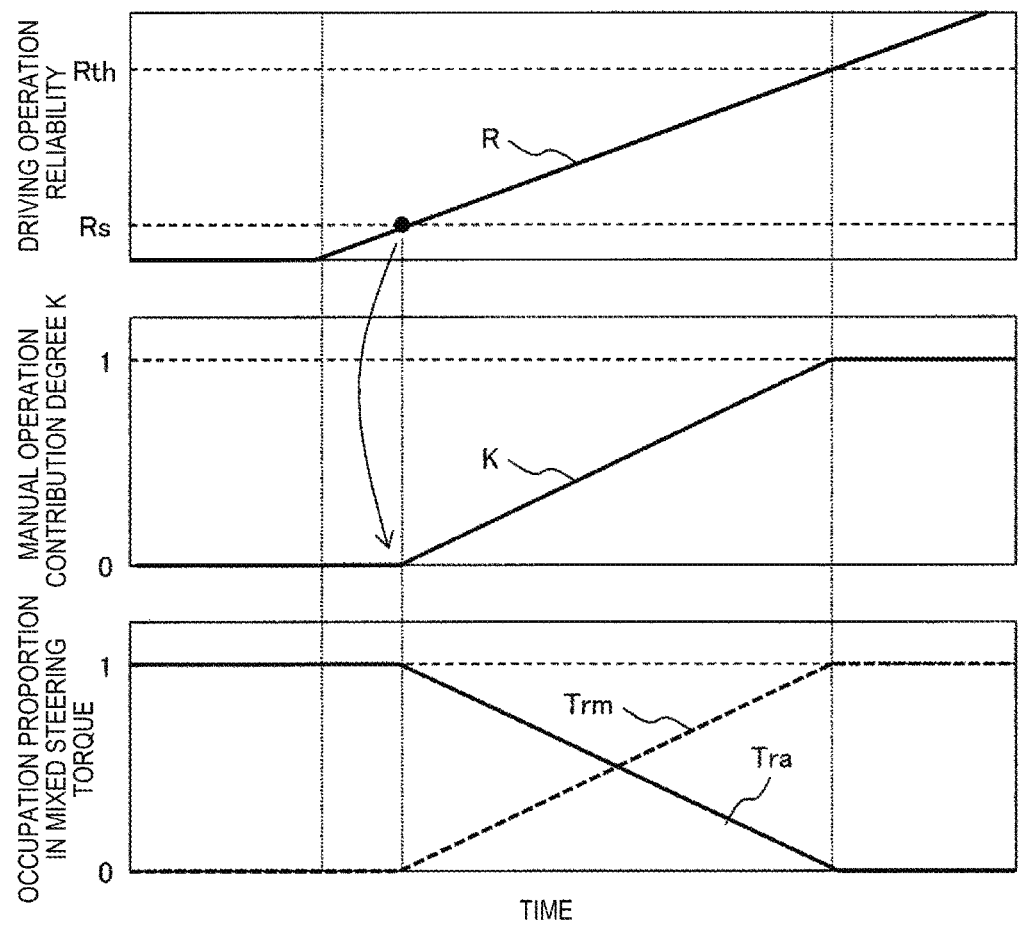

[FIG. 12]
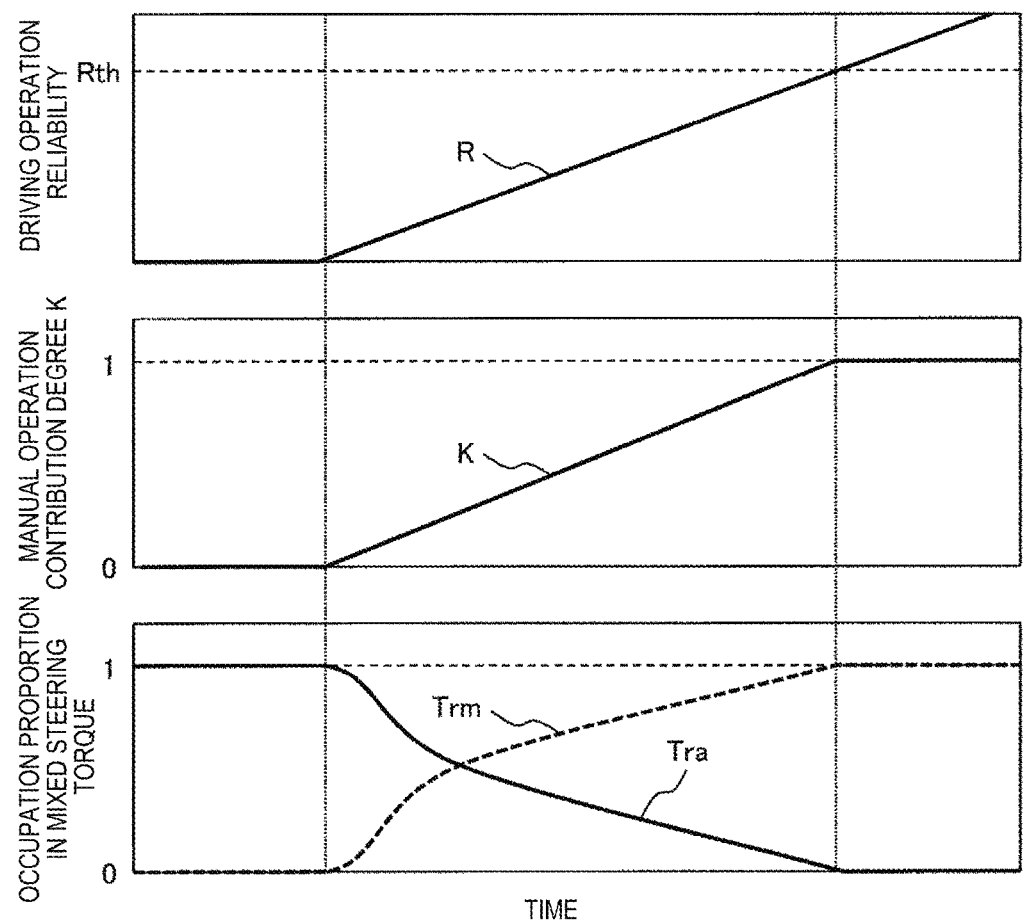

[FIG. 13]
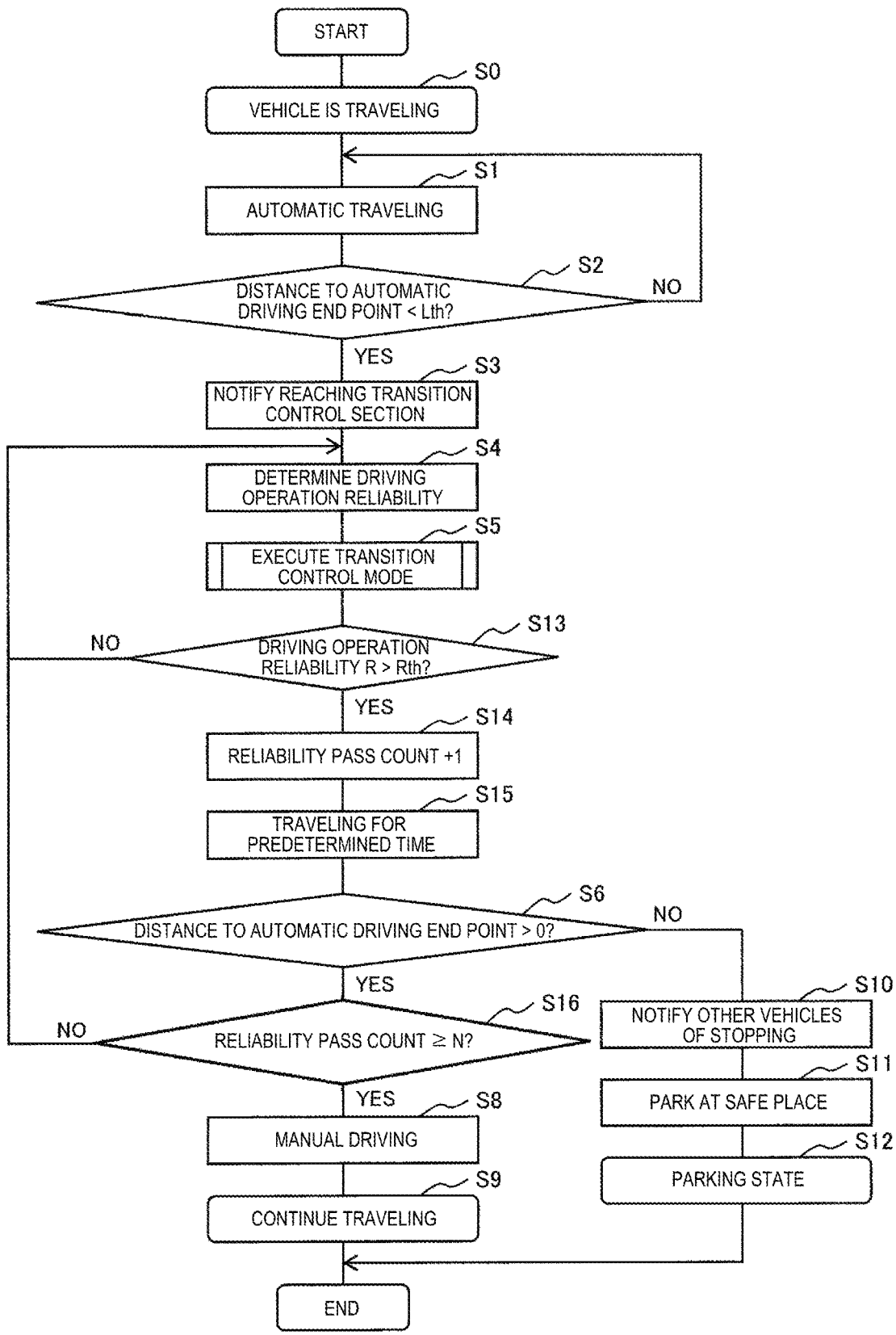

[FIG. 14]
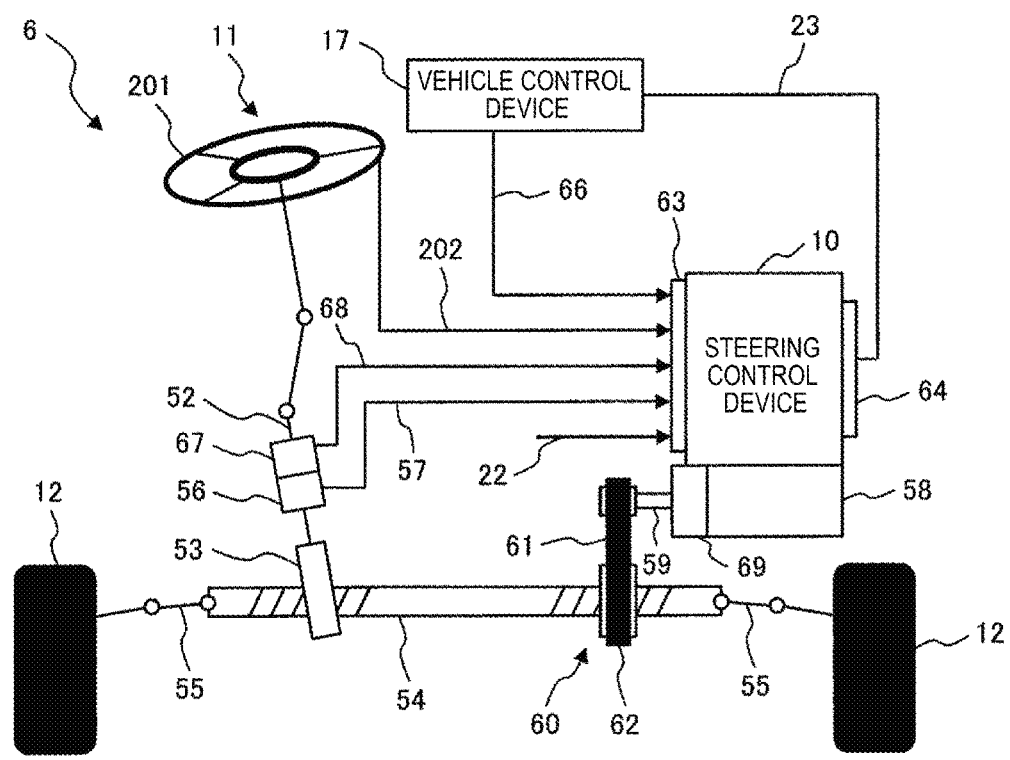

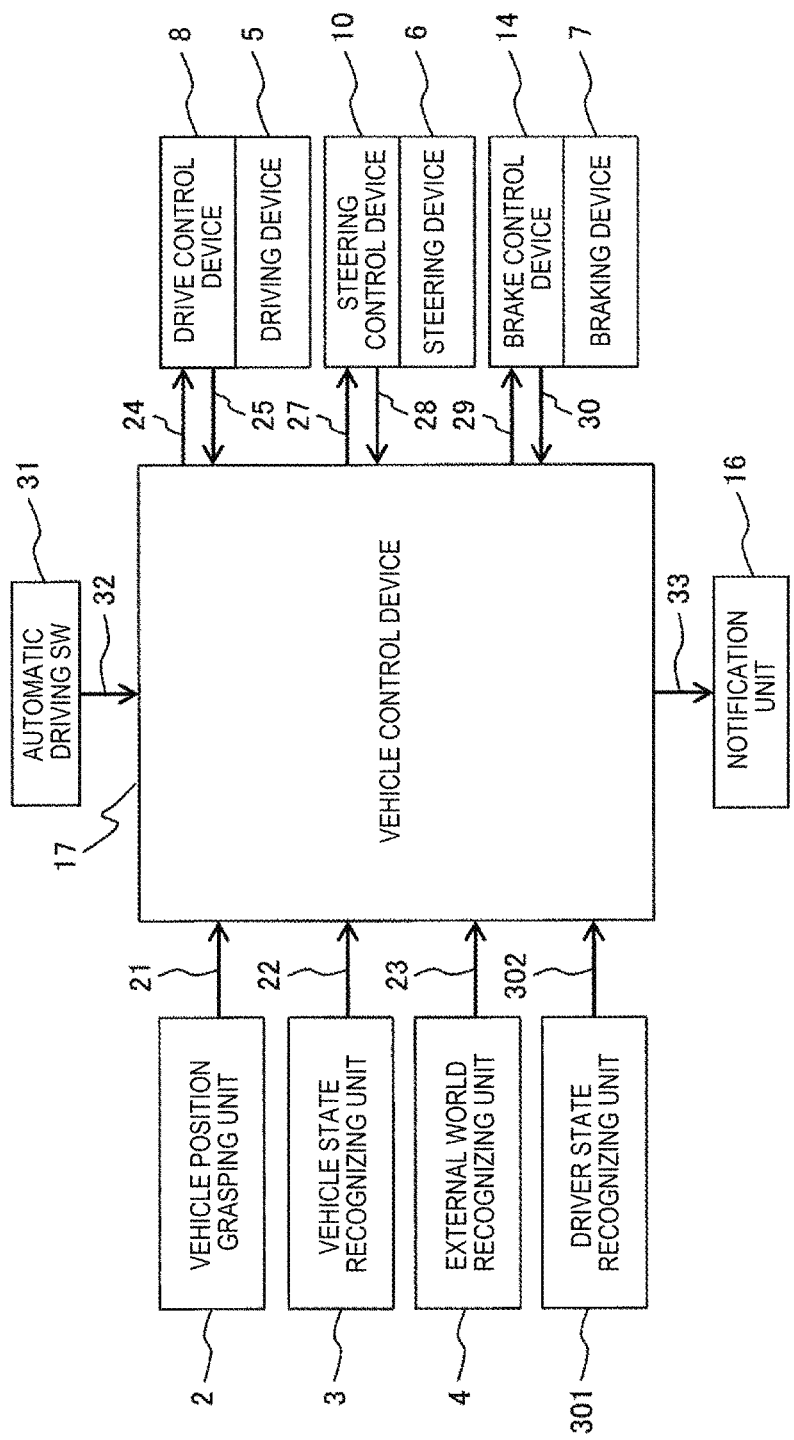
[FIG. 15]

STEERING CONTROL DEVICE AND CONTROL METHOD FOR STEERING CONTROL DEVICE

TECHNICAL FIELD

The present invention relates to a steering control device for an automobile or the like, and more particularly, to a steering control device and a control method for a steering control device that safely perform a transition from an automatic driving mode to a manual driving mode.

BACKGROUND ART

A power steering device or the like is used as a steering device of an automobile. However, as a control device used for a steering device at recent, as disclosed in, for example, JP-A-H4-55168 (PTL 1), there is known a control device having a function of selecting two controls of (1) assist control for controlling an actuator provided with a motor or the like based on a driving state of the vehicle and applying a steering assist force for assisting a steering force of a driver and (2) automatic steering control for generating a target steering angle based on a command value of a high-level controller and controlling the actuator to automatically adjust a turning wheel steering angle.

In addition to this, as disclosed in, for example, JP-A-H10-329575 (PTL 2), in order to switch from an automatic driving mode to a manual driving mode without giving a driver an extra tension feeling, there is known a control device having a function of detecting driving operation of the driver during the automatic driving mode and performing switching from the automatic driving mode to the manual driving mode in a case where it is determined that a state of the detected driving operation corresponds to a predetermined reference operation state.

In addition, in PTL 2, in the case of transitioning from the automatic driving mode to the manual driving mode, the driver takes a posture of the driving operation in advance and performs the driving operation corresponding to the reference operation state at an appropriate timing and perform vehicle traveling in the manual driving mode while performing this driving operation. Furthermore, in order to perform smooth transition to the manual driving mode, a proportion contributing to the traveling control in the automatic driving mode is allowed to be gradually reduced, and a proportion of the driving operation of the driver contributing to the vehicle traveling by the manual driving mode is concurrently allowed to be gradually increased.

CITATION LIST

Patent Literature

PTL 1: JP-A-H4-55168
PTL 2: JP-A-H10-329575

SUMMARY OF INVENTION

Technical Problem

Meanwhile, in the automatic traveling vehicle control device disclosed in PTL 2, control is performed so that the transition from the automatic driving mode to the manual driving mode is performed in a case where the driver performs the driving operation corresponding to the reference operation state during the automatic driving mode and the transition to the manual driving mode is prohibited in a case where the driving operation deviates from the reference state.

However, the above-described device is configured so that, in the case of performing the steering control according to this method, unless the vehicle is traveling on a curved road or the like, the driving operation corresponding to the reference operation state cannot be detected. Therefore, in the case of traveling on a straight road, the automatic driving mode is continued even when it is necessary to perform transition to the manual driving mode. There is a concern that this may cause the following errors.

In other words, in an automobile that performs automatic driving in a limited section of an exclusive automobile road such as a highway, it is considered that a straight road portion leading to the exit of the exclusive automobile road is appropriate for the place to request the cancellation of the automatic driving mode except for the cancellation due to a failure of an automatic driving system, the safety of the vehicle due to the reason why it is easy to maintain safety of the vehicle during the traveling.

In PTL 2, there is a concern that, in a state where the vehicle is traveling on a straight road portion, without switching to the manual driving mode, the automatic driving mode may be continued even after passing through the exclusive automobile road. In addition, in a case where the driving operation of the driver deviates from the reference operation state during the transition from the automatic driving mode to the manual driving mode, the transition to the manual driving mode is prohibited, and the automatic driving mode is continued.

Furthermore, in a state where the vehicle is traveling on a straight road portion, since the driver easily goes into the reference operation state without positively performing driving operation, even if the driving operation of the driver is unreliable, there is a concern that the vehicle may perform transition to the manual driving mode. In addition, in order to cope with an unexpected situation, even in a case where the driver urgently operates the steering wheel, there is a concern that the automatic driving mode may not be canceled. In addition, in a case where the driver who has been in a state of releasing the hands from the steering wheel during automatic driving suddenly grips the steering wheel, the steering satisfying the reference operation state is temporarily performed. However, in a case where the steering cannot be continued to be performed accurately after that, there is a concern that the behavior of the vehicle may become unstable after complete transition to the manual driving.

In any case, the automatic traveling vehicle control device described in PTL 2 has at least one of the above-mentioned problems, and it is demanded to address this problem.

The present invention is to provide a novel steering control device and a novel control method of a steering control device capable of safely perform transition from an automatic driving mode to a manual driving mode in a case where it is necessary to perform transition from the automatic driving mode to the manual driving mode.

Solution to Problem

A characteristic of the present invention lies in that in a case where it is determined that it is necessary to perform transition from an automatic driving mode to a manual driving mode during the automatic driving mode, a transition period to the manual driving mode is set before a time point at which the automatic driving mode is ended, a driving operation reliability of a driver as to whether or not it is possible to perform the transition to the manual driving mode during the transition period is determined, and in a case where it is determined that it is possible to perform the transition to the manual driving mode, the transition from the automatic driving mode to the manual driving mode is permitted.

Advantageous Effects of Invention

According to the present invention, it is possible to complete the transition from the automatic driving mode to the manual driving mode according to the driving operation reliability by the end time point of the automatic driving mode, and thus, in a case where the driver who does not perform driving operation during traveling in the automatic driving mode is not accustomed to the manual driving, it is possible to control so as not to immediately perform transition to the manual driving. Therefore, in the transition period from the automatic driving mode to the manual driving mode, if it is determined that the driver is not accustomed to the manual driving, the automatic driving mode is continued, so that safe driving can be continued.

BRIEF DESCRIPTION OF DRAWINGS

FIG. 1 is a configuration diagram illustrating an overall configuration of a vehicle equipped with a steering device according to the present invention.

FIG. 2 is a configuration diagram illustrating configurations of a vehicle control device and each control unit connected to the vehicle control device.

FIG. 3 is a configuration diagram illustrating a configuration of a vehicle control device according to a first embodiment of the present invention.

FIG. 4 is a configuration diagram illustrating a configuration of a steering device according to the first embodiment.

FIG. 5 is a configuration diagram illustrating the configuration of the steering control device illustrated in FIG. 4.

FIG. 6 is a configuration diagram illustrating a configuration of a steering reliability determinator illustrated in FIG. 5.

FIG. 7 is an overall control flowchart of the steering control device according to the first embodiment of the present invention.

FIG. 8A is a diagram illustrating a change in vibration when a steering wheel is not gripped.

FIG. 8B is a diagram illustrating a change in vibration when the steering wheel is gripped.

FIG. 9 is a control flowchart at the time of transition from an automatic driving mode to a manual driving mode.

FIG. 10 is a diagram illustrating a first relationship between a driving operation reliability, a manual operation contribution degree, and a mixed steering torque value.

FIG. 11 is a diagram illustrating a second relationship between a driving operation reliability, a manual operation contribution degree, and a mixed steering torque value.

FIG. 12 is a diagram illustrating a third relationship between a driving operation reliability, a manual operation contribution degree, and a mixed steering torque value.

FIG. 13 is a control flowchart of a steering control device according to the second embodiment of the present invention.

FIG. 14 is a configuration diagram of a steering device according to a third embodiment of the present invention.

FIG. 15 is a configuration diagram illustrating a configurations of a steering control device according to a fourth embodiment of the present invention and each control unit connected to the steering control device.

DESCRIPTION OF EMBODIMENTS

Hereinafter, embodiments of the present invention will be described in detail with reference to the drawings. The present invention is not limited to the embodiments described below, and various modifications and application examples within the technical concept of the present invention also fall within the scope of the present invention.

First Embodiment

Hereinafter, a first embodiment of the present invention will be described. The configuration described with reference to FIGS. 1 to 5 is common to each of the embodiments described below.

FIG. 1 is a configuration diagram illustrating a configuration of a vehicle equipped with a steering device according to the present invention. In FIG. 1, an automobile (hereinafter, referred to as a vehicle) 1 includes a vehicle position grasping unit 2 configured with map information, GPS, and the like for recognizing a position of an own vehicle, a vehicle state recognizing unit 3 for grasping a traveling state of the vehicle such as vehicle posture, speed, and acceleration, and an external world recognizing unit 4 for recognizing the position of the vehicle on a road attached to each component of the vehicle and configured with a radar, a camera, a sensor, and the like.

Furthermore, the vehicle 1 includes at least a driving device 5, a steering device 6, and a braking device 7 for causing the vehicle 1 to travel. The driving device 5 is attached with a drive control device 8 and an accelerator pedal 9 to apply a driving force to the drive wheels. In addition, the steering device 6 is attached with the steering control device 10 and the steering wheel 11 to turn the front wheels 12. Furthermore, the braking device 7 is connected to the brake control device 14 and the brake pedal 15 and brakes the rotation of the front wheel 12 and the rear wheel 13 to apply a braking force to the vehicle 1.

Furthermore, a notifying unit 16 for notifying the driver of the state of the vehicle 1 is provided, and a vehicle control device 17 to which information is input from the vehicle position grasping unit 2, the vehicle state recognizing unit 3 and the external world recognizing unit 4 and which output a control amount for controlling the drive control device 8, the steering control device 10, the brake control device 14, and the notifying unit 16 is provided.

FIG. 2 illustrates a relationship between the vehicle control device 17 of the vehicle 1 and each control device connected thereto. The vehicle control device 17 is input with vehicle position information 21 acquired by the vehicle position grasping unit 2, vehicle state information 22 such as speed, acceleration and yaw rate of the vehicle acquired by the vehicle state recognizing unit 3, and external environment information 23 of a driving lane, close-by vehicles, obstacles, and the like acquired by the external world recognizing unit 4.

Furthermore, the vehicle control device 17 is connected to a drive control device 8 controlling the driving device 5, a steering control device 10 controlling the steering device 6, a brake control device 14 controlling the braking device 7, and the like through a communication unit in the vehicle 1.

The vehicle control device 17 applies a drive control amount 24 to the drive control device 8 and receives a torque generated by the driving device 5, an operation amount of the accelerator pedal 9 by the driver, and the like as drive information 25 from the drive control device 8.

The vehicle control device 17 also applies a steering control amount 27 to the steering control device 10 and receives a steering angle by the operation of the steering device 6, an operation amount of the steering wheel 11 by the driver, and the like as steering information 28 from the steering control device 10.

Furthermore, the vehicle control device 17 applies a brake control amount 29 to the brake control device 14 and receives a braking force by the operation of the braking device 7, an operation amount of the brake pedal 15 by the driver, and the like as braking information 30 from the brake control device 14.

Furthermore, an automatic driving instruction signal 32, which is a signal from an automatic driving mode SW 31 for switching the driving mode according to the operation by the driver, is input to the vehicle control device 17, and the vehicle control device 17 outputs various notification signals 33 to the notifying unit 16.

FIG. 3 is a configuration diagram illustrating main control unit related to the present embodiment of the vehicle control device 17, which is configured with an automatic driving controller 36, a manual driving controller 38, a reliability determinator 40, a transition controller 42, and a control selector 43. These control unit are those in which in fact the respective functions are executed by arithmetic functions of a program processed by a microcomputer.

In the "automatic driving mode", the automatic driving controller 36 generates an appropriate traveling track of the vehicle 1 from the input information such as the vehicle position information 21, the vehicle state information 22, the external environment information 23, the drive information 25, the steering information 28, the braking information 30, and the like described above and determines an automatic driving control amount 35 to be transmitted to the respective actuators of the drive control device 8, the steering device 6, and the braking device 7.

The manual driving controller 38 determines the manual driving control amount 37 to be transmitted to the actuators of the drive control device 8, the steering device 6, the braking device 7 from the operation amount based on the operation of the accelerator pedal 9, the steering wheel 11, and the brake pedal 15 by the driver in the "manual driving mode". In addition, the manual driving control amount 35 is also transmitted to a transition controller 42 and a control selector 43 described later.

The reliability determinator 40 obtains the driving operation reliability 39 as to whether or not the driver can perform the manual driving when performing the transition from the "automatic driving mode" to the "manual driving mode", and the driving operation reliability 39 is transmitted to the transition controller 42 described later. The driving operation reliability 39 is a value obtained by determining whether or not the driving operation of the driver is reliable based on the information input to the vehicle control device 17 and converting the determination result into a numerical value. The details of the reliability determinator 40 will be described later.

When the vehicle 1 is executing the automatic driving by the automatic driving controller 36, in a case where it is determined according to the determination of the vehicle control device 17 that the transition from the "automatic driving mode" to the "manual driving mode" by the operation of the driver is necessary, the transition controller 42 outputs the transition control amount 41 by using at least the automatic driving control amount 35, the manual driving control amount 37, and the driving operation reliability 39.

The control selector 43 selects an appropriate control mode according to the driving situation from among the automatic driving control amount 35, the manual driving control amount 37, and the transition control amount 41. The control amounts (the drive control amount 24, the steering control amount 27, and the brake control amount 29) to the respective actuators of the driving device 5, the steering device 6 and the braking device 7 are output from the vehicle control device 17 based on the control mode selected by the steering selector 43.

FIG. 4 illustrates the structure of the steering device 6 in more detail. The steering device 6 includes a steering wheel 11, a steering shaft 52, a pinion axle 53, and a rack axle 54. An electric motor 58 serving as an actuator is connected to the rack axle 54 through a speed reduction mechanism 60. Rack teeth meshing with the pinion axle 53 are formed on the rack axle 54 to constitute a mechanism of a rack and pinion to convert the rotation of the pinion axle 53 into the linear motion of the rack axle 54.

That is, if the driver operates the steering wheel 11, the rotation is transmitted to the pinion axle 53 through the steering shaft 52, and is converted into the linear motion of the rack axle 54 by a rack and pinion mechanism. As a result, the front wheels 12 connected through the tie rods 55 connected to both ends of the rack axle 54 are turned.

A torque sensor 56 is provided between the steering shaft 52 and the pinion axle 53, and the torque sensor 56 outputs the steering torque information 57 based on the torsion angle of a torsion bar (not illustrated). The torsion bar is disposed at a connecting portion between the steering shaft 52 and the pinion axle 53. In addition, the steering angle sensor 67 installed closer to the steering shaft 52 than the torsion bar outputs the steering angle information 68 which is the rotation angle of the steering wheel 11.

In the example illustrated in FIG. 4, the speed reduction mechanism 60 connected to the output shaft 59 of the electric motor 58 uses a ball screw 62 driven by a belt/pulley 61 attached to the output shaft 59 of the electric motor 58. With this configuration, the torque of the electric motor 58 is converted into the translation directional force of the rack axle 54. In addition, the speed reduction mechanism 60 may use a configuration using a rack and pinion similarly to the input of the steering wheel 11, a configuration in which a ball screw nut is directly driven by a hollow motor, or the like.

The steering control device 10 includes an input terminal 63 and an output terminal 64. The input terminal 63 of the steering control device 10 is input with, for example, input information 66, steering torque information 57, steering angle information 68, and vehicle state information 65 such as a vehicle speed including steering control amounts related to automatic driving control, manual driving control, and transition control output from the vehicle control device 17. In addition, the output control amount 23 including the steering control amount of the steering device 86 is output from the output terminal 64 of the steering control device 10.

FIG. 5 is a configuration diagram of the steering control device 10 that controls the steering device 6. As illustrated in FIG. 5, the steering control device 10 includes an automatic steering controller 71, a manual steering controller 72, and a steering reliability determinator 75. This illustrates the configuration in a case where the automatic driving controller 36, the manual driving controller 38, the reliability determinator 40, the transition controller 42, and the control selector 43 illustrated in FIG. 3 are used for steering control.

The automatic steering controller 71 is input with a steering control amount 26 related to the steering device 6 included in the automatic driving control amount 35 illustrated in FIG. 3 output from the vehicle control device 17, steering information 27 indicating the state of the steering device 6, and vehicle state information 65. Herein, the steering control amount 26 input to the automatic steering controller 71 is a target steering angle, a target steering force, and the like of the front wheels 12, for correcting a deviation in a case where the traveling track or the traveling lane of the own vehicle deviates from a target track or a target lane during the automatic driving of the vehicle 1. Hereinafter, as an example thereof, a case of automatic steering according to the target steering angle will be described.

In addition, the steering information 27 input to the automatic steering controller 71 includes information such as steering angle information 68, steering torque information 57, and electric motor rotation angle information obtained from various sensors attached to the steering device 6. Based on these pieces of input information, the automatic steering controller 71 outputs automatic steering torque information 73. Herein, the automatic steering torque information 73 is set to, for example, a torque command value for requiring the electric motor 58 to give a power for removing a steering angle difference in order to reduce a difference between the actual steering angle of the front wheels 12 calculated from the electric motor rotation angle information and the target steering angle.

The manual steering controller 72 is input with the steering control amount 26 related to the steering device included in the manual driving control amount 37 output from the vehicle control device 17, the steering information 27 indicating the state of the steering device 6, and the vehicle state information 65. Herein, the steering control amount 26 input to the manual steering controller 72 is, for example, information such as a signal instructing the execution of the manual steering and a correction value in a case where it is necessary to correct the manual operation from the vehicle state.

In addition, the steering information 27 input to the manual steering controller 72 includes information such as steering angle information 68, steering torque information 57, and electric motor rotation angle information obtained from the respective sensors attached to the steering device 6. This is similar to that the automatic steering controller 71. The manual steering controller 72 outputs manual steering torque information 74 for assisting steering input by the driver based on these pieces of input information. Herein, the manual steering torque information 74 is set to, for example, a torque command value for requiring the electric motor 58 to give a power in order to generate an assist force for assisting the steering force of the driver calculated based on the value of the steering torque information 57.

Herein, the torque information and the torque command value correspond to the current value input to the electric motor 58. Therefore, in the following description, what is referred to as torque information or torque command value can be read as the current value input to the electric motor 58.

Steering information 27, a steering control amount 26, and vehicle state information 65 are input to the steering reliability determinator 75. The steering reliability determinator 75 calculates and outputs driving operation reliability information 76 by using these pieces of information. In addition, the steering reliability determinator 75 simultaneously outputs the determination torque information 82 for calculating the driving operation reliability information 76. Details of the determination torque information 82 will be described later.

Automatic steering torque information 73, manual steering torque information 74, driving operation reliability information 76, and determination torque information 82 are input to a mixed steering controller 77, and mixed steering torque information 78 obtained by mixing the automatic steering torque information 73, the manual steering torque information 74, and the determination torque information 82 based on the driving operation reliability information 76 is output.

The steering control amount 26, the automatic steering torque information 73, the manual steering torque information 74, and the mixed steering torque information 78 are input to a steering control selector 79. Herein, the steering control selector 79 outputs the torque command value 81 to a motor drive circuit 80 according to the driving mode flag defined corresponding to the steering control amount 26. Then, the motor drive circuit 80 generates a drive current so as to generate a torque equivalent to the input torque command value 81 and drives the electric motor 58 of the steering device 6.

FIG. 6 is a configuration diagram of the steering reliability determinator 75 used in the steering control device 10. The steering reliability determinator 75 includes at least a steering wheel (SW) mechanical vibration generation unit 91, a SW mechanical vibration estimation unit 92, and a steering reliability determination unit 93. The SW mechanical vibration generation unit 91 receives a driving mode flag defined corresponding to the steering control amount 26. Therefore, the necessity of the transition control from the "automatic driving mode" to the "manual driving mode" is determined from the information of the driving mode flag, and if it is determined that the transition control is necessary, the SW mechanical vibration generation unit 91 outputs the determination torque information 82 necessary for the electric motor 58 to generate mechanical vibration having a predetermined frequency.

The determination torque information 82 is a current for rotating the electric motor 58 forward and backward by a predetermined amount and is applied to the electric motor 58 at a predetermined frequency. The mechanical vibration caused by the forward and backward rotation of the electric motor 58 flows backward through the steering coupling mechanism from the electric motor 58 to the steering wheel 11 and is applied as the forward and backward rotational vibration of the steering wheel 11.

The SW vibration estimation unit 92 is input with the steering torque information 57 and the steering angle information 68 included in the steering information 27, and a rotational vibration occurring in the steering wheel according to the determination torque information 82 generated by the SW mechanical vibration generation unit 91 and a rotational vibration change (for example, a steering angle change due to turning required for traveling) due to other causes are separated. Only the rotational vibration 94 of the steering wheel 11 based on the SW mechanical vibration generation unit 91 is extracted and output.

In addition, the steering reliability determination unit 93 is input with the rotational vibration of the steering wheel 11 according to the determination torque information 82 and the actual rotational vibration 94 of the steering wheel 11 detected by the steering angle sensor 67, and the driving operation reliability 76 is calculated and output based on the vibration information. Herein, the rotational vibration of the steering wheel 11 according to the determination torque information 82 may be obtained in advance by an appropriate work or may be obtained by simulation. A method of comparing the rotational vibration of the steering wheel 11 will be described with reference to FIGS. 8A and 8B.

Next, a specific embodiment of the steering control device having the above-described configuration will be described. In the drawings, the same elements are denoted by the same reference numerals, and redundant description is omitted.

FIG. 7 is an overall control flowchart schematically illustrating a control of the vehicle control device 17 and the steering control device 10 in a case where the vehicle approaches the automatic driving end time point (herein, described as a point) while the vehicle is traveling in the "automatic driving mode" of the vehicle 1. In addition, in the following description, with respect to the automatic driving end point, for example, the exit of the exclusive automobile road is set as the end point.

<<Step S0>>

In step S0, the vehicle 1 enters an exclusive automobile road and travels on the exclusive automobile road. At this time, the driver manually performs driving operation and the vehicle is being steered accordingly.

<<Step S1>>

In step S1, when the automatic driving SW 31 is selected by the driver to be in the "automatic driving mode", as illustrated in FIG. 3, the vehicle control device 17 calculates the automatic driving control amount 35 by using the automatic driving controller 36 based on the vehicle position information 21, the vehicle state information 22, the external environment information 23.

In addition, the vehicle control device 17 operates to select and output the automatic driving control amount 35 from the vehicle control device 17 by using the control selector 43 based on the vehicle position information 21, the vehicle state information 22, and the external environment information 23. Upon receiving the automatic driving control amount 35, the respective actuators of the drive control device 8, the steering control device 10, the brake control device 14 and the like perform control corresponding to the traveling in the "automatic driving mode". After that, the process proceeds to step S2.

<<Step S2>>

In step S2, when the vehicle 1 approaches a point (exit) where the vehicle 1 leaves the exclusive automobile road, based on the vehicle position information 21 and the external environment information 23, it is determined that the vehicle 1 approaches the automatic driving end point and has reached the transition control section from the "automatic driving mode" to the "manual driving mode". The transition control section is a section, for example, from a point away from the automatic driving end point by a distance of a transition distance Lth (for example, 100 m to 200 m) to the automatic driving end point.

Then, in a case where the transition distance from the vehicle 1 to the automatic driving end point is less than Lth, it is determined that the vehicle has reached the transition control section, and the process proceeds to step S3. When it is determined that the vehicle has not reached the transition control section, the process returns to step S1. Therefore, the automatic driving is continued until the start point of the transition control section.

Herein, the distance in the case of traveling before the automatic driving end point is indicated by "+", and the distance in the case of passing the automatic driving end point is indicated by "−". In addition, it is preferable that the distance Lth is set as a distance where, for example, in the switching from the "automatic driving mode" to the "manual driving mode", the driver who has not operated the operation of the operation input unit such as the steering wheel 11 during the automatic driving can deal with the manual driving with a sufficient margin.

<<Step S3>>

In step S3, when determining that the vehicle has reached the transition control section, the vehicle control device 17 notifies the driver that the vehicle has reached the transition control section by using the notifying unit 16 and prompts the driver to start the manual driving. Herein, the notifying unit 16 can perform guiding according to, or example, voice information using a speaker and visual information by an indicator or a display. After that, the process proceeds to step S4.

<<Step S4>>

In step S4, the determination of the driving operation reliability information 39 of the driver is performed. In the present embodiment, the driving operation reliability information 39 illustrated in FIG. 3 is calculated by the steering reliability determinator 75 provided to the steering control device 10 illustrated in FIG. 5. That is, the driving operation reliability information 76 obtained by the steering reliability determinator 75 is regarded as the driving operation reliability information 39.

For this reason, the reliability determinator 40 illustrated in FIG. 3 sets the driving operation reliability information 76 included in the steering information 28 transmitted by the steering control device 10 as the driving operation reliability information 39 which is the output from the reliability determinator 40. This corresponds to the driving operation reliability information 76 input to the vehicle control device 17 illustrated in FIG. 5.

Next, a method of calculating the driving operation reliability 76 by the steering control device 10 will be described. As described above, upon transition to the "transition control mode", the SW mechanical vibration generation unit 91 provided to the steering reliability determinator 75 as illustrated in FIG. 6 generates the determination torque information 82. Herein, as described above, the determination torque information 82 is a torque command value for causing the electric motor 58 to generate a torque that causes the steering wheel 11 to perform a rotational vibration operation.

For example, the determination torque information 82 is a torque command value for causing the electric motor 58 to generate mechanical vibration having a frequency of a predetermined value greater than a natural frequency related to turning of the vehicle 1 including the steering device 10 so as not to affect the turning operation of the vehicle 1 and having a magnitude to the extent that the change can be felt by the driver. The mechanical vibration caused by the electric motor 58 is applied to the steering wheel 11, which is a minute rotational vibration of the steering wheel 11.

In addition, by using the SW mechanical vibration estimation unit 92, only the rotational vibration 94 of the steering wheel 11 vibrating with the determination torque information 82 being applied to the electric motor 58 is extracted from the detection result of the steering angle sensor 67. In order to extract only the vibration according to the determination torque information 82, the extraction can be performed, for example, by performing filtering on the steering angle information with a high-pass filter, a band-pass filter, or the like.

Then, the steering reliability determination unit 93 provided to the steering reliability determinator 75 determines the driving operation reliability 76. The driving operation reliability can be determined, for example, by the method illustrated in FIGS. 8A and 8B. FIGS. 8A and 8B illustrate changes in the rotation angle of the steering wheel in a case where the mechanical vibration is applied to the steering wheel 11 while the vehicle 1 is traveling straight.

FIG. 8A illustrates a change in the rotation angle of the steering wheel in a state where the driver releases the hands from the steering wheel 11, and FIG. 8B illustrates a change in the rotation angle of the steering wheel in a state where the driver grips the steering wheel 11. As illustrated in FIG. 8A, in a case where the driver releases the hands from the steering wheel 11, the amplitude of the rotation angle is θ0, whereas as illustrated in FIG. 8B, if the driver grips the steering wheel 11, the amplitude of the rotation angle decreases to θ1.

This is because the impedance of the driver's arm is added to the system including the steering device 10 by gripping the steering wheel 11, so that the vibration of the steering wheel 11 is suppressed. In addition, as compared with the case where the driver grips the steering wheel 11 while driving aimlessly, in the case where the driver concentrates on the manual driving, the driver tends to firmly grip the steering wheel 11 by applying a force to the arms and the hands.

For this reason, in a case where the steering wheel 11 is firmly gripped, the impedance becomes larger, and thus, the vibration of the steering wheel 11 becomes smaller. By utilizing this tendency, the driving operation reliability R can be calculated, for example, as the driving operation reliability R=θ0−θ1. The driving operation reliability R corresponds to the driving operation reliability information 76. The obtained driving operation reliability R is transmitted to the vehicle control device 17, and the process proceeds to step S5.

<<Step S5>>

In step S5, the "transition control mode" of performing transition from the "automatic driving mode" to the "manual driving mode" is started. During the transition control, the operation is performed so that the transition control amount 41 is calculated by the transition controller 42 of the vehicle control device 17 illustrated in FIG. 3, and that the transition control amount 41 is output as the control amount from the vehicle control device 17 by using the control selector 43. Herein, at least the automatic driving control amount 35, a transition control mode flag indicating that the driving mode is in the "transition control mode" and a driving operation reliability R are defined in the transition control amount 41. Furthermore, in addition to this, the transition control amount 41 may include an assist control amount for performing control for assisting the manual driving (such as reaction force control of the steering wheel 11 accompanying lane keep assist or the like).

The control state of the steering device 10 related to the "transition control mode" is illustrated in the control flow of FIG. 9. Therefore, in the following description, the control flow illustrated in FIG. 9 will be described instead of the description of the control flow illustrated in FIG. 7. In addition, this "transition control mode" is executed only while the vehicle 1 is within a predetermined distance Lth from the end point at which the vehicle 1 ends the "automatic driving mode".

<<Step S20>>

In step S20, when the transition control mode flag is received from the vehicle control device 17, the vehicle 1 traveling in the "automatic driving mode" until that time is in the transition state where the vehicle 1 is switched to the "transition control mode". Upon being switched to the "transition control mode", the process proceeds to step S21.

<<Step S21>>

In step S21, the automatic steering controller 71 illustrated in FIG. 5 calculates automatic steering torque information (hereinafter, referred to as an automatic steering torque value) 73 by using a steering angle command value included in the steering control amount 27, and similarly, the manual steering controller 72 calculates manual steering torque information (hereinafter, referred to as a manual steering torque value) 74 by using a steering torque value and an assist control amount included in the steering control amount 27. When these torque values are calculated, the process proceeds to step S22.

<<Step S22>>

In step S22, the mixed steering controller 77 illustrated in FIG. 5 calculates the manual operation contribution degree K by using the driving operation reliability R. The manual operation contribution degree K is, for example, a value obtained by multiplying the driving operation reliability R by a certain gain and is calculated as a value to become a minimum value to 0 in a state where the driver releases the hands from the steering wheel 11 and to become a maximum value to 1 when the driver has reached the driving operation reliability Rth, in which the driver firmly grips the steering wheel 11 and is considered to be capable of manual driving. When this manual operation contribution degree K is obtained, the process proceeds to step S23.

<<Step S23>>

In step S23, the mixed steering torque information (hereinafter, referred to as a mixed steering torque value) is calculated by the mixed steering controller 77. If the mixed steering torque value is denoted by TM, for example, when the automatic steering torque value 73 is denoted by TA and the manual steering torque value 74 is denoted by TH, the mixed steering torque value can be calculated using the manual operation contribution degree K by a formula of $TM=(1-K) \times TA + K \times TH$.

FIG. 10 illustrates change in the manual operation contribution degree K and the proportions of the automatic steering torque value and the manual steering torque value in the mixed steering torque value in a case where the driving operation reliability R increases at a constant rate as time elapses.

The upper portion of FIG. 10 illustrates the change state of the driving operation reliability R as time elapses, the middle portion thereof illustrates the change state of the manual operation contribution degree K on the same time axis, and the lower portion illustrates the proportion Tra of the automatic steering torque value and the proportion trm of the manual steering torque value in the mixed steering torque value. The driving operation reliability Rth is a threshold value of the driving operation reliability. As illustrated in the middle portion of FIG. 10, since the manual operation contribution degree K takes values of "0" to "1" according to the driving operation reliability R, as illustrated in the lower portion of FIG. 10, the proportion of the automatic steering torque value and the manual steering torque value in the mixed steering torque value change according to the magnitude of the driving operation reliability R.

That is, immediately after the transition to the "transition control mode", in a case where the driver does not grip or grip strongly the steering wheel 11 or does not strongly grip the steering wheel, the steering device 6 is operated by the "automatic steering mode". In a case where the driver firmly grips the steering wheel 11 and the driving operation reliability R reaches a sufficient value, the steering device 6 is operated by the manual steering of the driver.

In addition, the change in the manual operation contribution degree K with respect to the change in the driving operation reliability R illustrated in FIG. 10 becomes great when the driving operation reliability R changes from "0". However, as illustrated in FIG. 11, the manual operation contribution degree K may be allowed to change from the point where the driving operation reliability R exceeds the threshold value Rs. By allowing such a change, in a case where the driving operation reliability R is low and there is a great concern that the driver erroneously operates, the control state by the "automatic driving mode" can be continued, so that it is possible to maintain further safe driving state.

In addition, although the proportions of the automatic steering torque value and the manual steering torque value in the mixed steering torque value with respect to the change in the driving operation reliability R illustrated in FIG. 10 is linearly changed, however as illustrated in FIG. 12, non-linear change may be assumed. Even with such a change, it is possible to obtain the same effect as the above-mentioned method.

<<Step S24>>

In step 24, the transition steering torque value which is the mixed steering torque information 78, is calculated by the mixed steering controller 77 illustrated in FIG. 5. The transition steering torque value is obtained by adding the determination torque information 82 calculated by the steering reliability determinator 75 described above to the mixed steering torque value calculated in step S23.

<<Step S25>>

In step S25, the steering mode is determined by reading the driving mode flag defined in the steering control amount input to the steering control selector 79 illustrated in FIG. 5. If it is determined that the steering mode is the "transition control mode", the process proceeds to step S26, and if not "transition control mode", the process proceeds to step 28. In step 28, the "automatic driving mode" or the "manual driving mode" is determined from the driving mode flag <<Step S26>>

In step S26, among the automatic steering torque value 73, the manual steering torque value 74, and the transition steering torque value 78, the transition steering torque value is output as the torque command value for the motor drive circuit 80 illustrated in FIG. 5.

<<Step S27>>

In step S27, the electric motor drive circuit 80 controls the electric current value to the electric motor 58 to drive and control the steering device 6. After that, the process returns to step S21, and steps S21 to S27 are repeated until the driving mode is switched. Herein, similarly to the steering device 6, also in the driving device 5 and the braking device 7, the manual operation amount (operation amounts of the accelerator pedal and the brake pedal) and the automatic operation amount (operation amounts of the accelerator pedal and the brake pedal) are controlled so as to be mixed according to the driving operation reliability R and affect the operation of the vehicle 1.

<<Step S28>>

Since it is determined in step S25 that the steering mode is not the "transition control mode", in this step 28, whether the "automatic driving mode" or the "manual driving mode" is determined from the driving mode flag. In the case of the "manual driving mode", the process proceeds to step S29, and in the case of the "automatic driving mode", the process proceeds to step S31.

<<Steps S29, 30, 31, and 32>>

In step S29, the manual steering torque value is obtained, and in step S30, the electric motor 58 is driven based on the manual operation torque value. Similarly, in step S31, the automatic steering torque value is obtained, and in step S32, the electric motor 58 is driven based on this automatic operation torque value.

As described above, in the "transition control mode", since the proportions of the automatic steering torque value and the manual steering torque value in the mixed steering torque value are controlled based on the driving operation reliability R, the operation of the manual driving is reflected as the driver is accustomed to the manual driving. Furthermore, if the driving operation reliability R reaches a predetermined reliability (threshold value) Rth, so that the manual driving is permitted, the transition to the manual driving is made, and if the driving operation reliability R does not reach the predetermined reliability Rth, so that the manual driving is not permitted, the automatic driving is continued, and thus, it is possible to maintain the safety of traveling of the vehicle 1.

Next, the processes in and after step S6 are executed in a state where the "transition control mode" is being executed or in a state where the "transition control mode" is ended. Hereinafter, returning to FIG. 7, the control will be described.

<<Step S6>>

In step S6, it is determined whether or not the vehicle 1 is traveling in the section before the automatic driving end point of the exclusive automobile road at the present time point. That is, if the vehicle 1 has reached the automatic driving end point, it is determined that the opportunity to execute the "transition control mode" has already disappeared, and if the vehicle 1 has not reached the automatic driving end point, it is considered that the opportunity to execute the "transition control mode" still exists. Therefore, if the vehicle 1 has not reached the automatic driving end point, the process proceeds to step S7, and if the vehicle 1 has reached the automatic driving end point, the process proceeds to step S10.

<<Step S7>>

In step S7, in a case where the vehicle 1 is traveling before the automatic driving end point, the driving operation reliability R and the threshold value Rth are compared in magnitude in this step. In a case where the driving operation reliability R is less than the threshold value Rth, the processes from step S4 to step S6 are repeated until the manual driving of the driver can be permitted. On the other hand, in a case where the driving operation reliability is greater than the threshold value Rth, it is determined that the manual driving of the driver can be permitted, and the process proceeds to step S8.

<<Steps S8, 9>>

In step S8, since the driving operation reliability R is sufficiently great, the "transition control mode" is ended, the manual driving control amount 37 is calculated by the manual driving controller 38 illustrated in FIG. 3, and the manual driving control amount 37 is set as the output of the vehicle control device 17 using the control selector 43.

In this manual driving control amount 37, at least a driving operation reliability R and a driving mode flag indicating that the driving mode is being controlled in the "manual driving mode" are defined. Furthermore, the transition control amount 41 may include an assist control amount for performing control of assisting the manual driving (such as reaction force control of the steering wheel 11 accompanying lane keep assist or the like).

As illustrated in FIG. 5, the steering control selector 79 determines that the mode is the "manual driving mode" in steps S25 and S28 of FIG. 9, selects the manual steering torque value as the torque command value in the steering control selector 79, and sets the steering torque value as the output of the steering control device 10. Then, the motor drive circuit 80 is controlled so that the electric motor 58 outputs the manual steering torque value, and in step S9, control corresponding to the manual steering of the driver is executed. In addition, actuators of the driving device 5 the braking device 7 and the like other than the steering device 10 also execute control corresponding to the operation input by the driver.

<<Step S10>>

On the other hand, in a case where it is determined in step S5 that the vehicle has exceeded the automatic driving end point, it is determined that the driving operation reliability R is not sufficient at the automatic driving end point, and the vehicle control device 17 uses the notifying unit 16 to notify other vehicles existing in the surroundings of the vehicle 1 that the vehicle 1 is stopped. Herein, for example, a hazard lamp is used as the notifying unit 16. Upon completion of this process, the process proceeds to step S11.

<<Steps S11 and 12>>

In step 11, a safe parking place around the vehicle 1 is searched using the external world information 23 and the like, a traveling route to the safe parking place is determined by the automatic driving controller 36, and the respective actuators of the driving device 5, the braking device 7 and the steering device 10 are controlled based on the automatic driving control amount 35, so that after moving to the safe parking place on the exclusive automobile road, the vehicle is in a stopped state in step S12.

Herein, the safe parking place is, for example, a sufficiently wide road shoulder of a road. At this time, since the "automatic driving mode" is selected in step S25 in FIG. 9, the steering control device 10 outputs the automatic steering torque value as the torque command value in step S29. In this case, the motor drive circuit 80 is controlled so that the electric motor 58 outputs the automatic steering torque value, and after that, the "automatic driving mode" in which automatic steering is performed is executed.

In addition, the actuators of the driving device 5 and the braking device 7 also execute control based on the automatic driving control amount 35. Furthermore, after the vehicle stops, for example, the vehicle may preform transition from the "automatic driving mode" to the "manual driving mode", so that the stopped state may be continued by the time when the operation of the driver is started, and the driving device 5 may be stopped so that it waits for the re-start by the driver.

As described above, in the vehicle 1 having the automatic driving function, in a case where the vehicle 1 is being operated in the "automatic driving mode", it is assumed that the driver is in a state where the driver releases the hands from the steering wheel 11 (hands-free state). In a case where it is assumed that the section in which the vehicle 1 can travel in the automatic driving is only a limited section such as an exclusive automobile road, it is necessary to perform transition to the "manual driving mode" at the end point of the automatic driving section.

At that time, there is a possibility that the driver who is not accustomed to the driving operation for having been in a hands-free state in the automatic driving section, erroneously performs the driving operation and disturbs the behavior of the vehicle 1 due to suddenly switching to the manual driving at the automatic driving end point. Particularly, since steering requires careful operation by the driver, it is considered that there is a great concern that err is made in driving operation.

Therefore, there is provided a transition control section for traveling in the "transition control mode" before the automatic driving end point by using the steering control device as illustrated in this embodiment, and in the transition control section, the transition control from the "automatic driving mode" to the "manual driving mode" is executed. In this transition control section, the driving operation reliability of the driver is determined, and as the driving operation reliability increases, the operation amount by the manual driving is reflected to the operation of the vehicle 1.

Therefore, when it is determined that the driver is not accustomed to the manual driving and the driving operation reliability is low, it is possible to prevent the transition to the manual driving immediately in the transition control section. In addition, in a case where the driving operation reliability is low, by mixing the "automatic driving mode" and the "manual driving mode", it is possible to change the influence of the manual operation on the operation of each actuator of the driving device, the braking device, and the steering device according to the magnitude of the manual operation contribution degree calculated by the driving operation reliability. Therefore, it is possible for the driver to be accustomed to the manual operation of the vehicle 1 in the transition control section.

In addition, in a case where the driver manually operates the steering wheel 11 with a clear intention, since the resistance due to the operation of the driver's arm increases and the driving operation reliability is determined to be high, it is also possible to quickly switch to manual driving. Furthermore, even though the automatic driving end point has been reached, in a case where the driver does not operate with intention, the driving operation reliability is determined to be low, and thus, the safe parking place may be searched for by using the automatic driving function of the "automatic driving mode" and the vehicle may be stopped at the safe parking place.

By executing the "transition control mode" in the process of performing the transition from the "automatic driving mode" to the "manual driving mode" based on such driving operation reliability, in the transition from the "automatic driving mode" to the "manual driving mode", the traveling can be continued or the stopping can be performed without the behavior of the vehicle 1 being disturbed, so that there is an effect that the traveling safety of the vehicle 1 can be sufficiently secured.

Furthermore, in the present embodiment, the driving operation reliability is obtained according to a change in the magnitude of vibration generated in the steering wheel 11 of the steering device 6 by the steering control device 10 in the "transition control mode". For this reason, it is possible to determine the driving operation reliability in any traveling state regardless of straight traveling or curved traveling of the vehicle 1. Furthermore, when the mode is shifted to the "transition control mode", the notifying unit 16 notifies the driver, and after that, the rotational vibration is generated in the steering wheel 11, so that the driver can be allowed to accurately recognize the "transition control mode" state.

As described above, according to the present embodiment, in the vehicle 1 provided with the steering device, it is possible to perform safe transition from the "automatic driving mode" to the "manual driving mode" up to the automatic driving end point.

In the present embodiment, the automatic driving end point is set to a predetermined point such as an exit of an exclusive automobile road. However, in a case where it becomes impossible to continue the "automatic driving mode" due to the deterioration in the recognition accuracy of the external world recognizing unit or the like, and thus, it is necessary to switch to the "manual driving mode" after a predetermined time based on the recognition result up to now, the vehicle position after the predetermined time or after the predetermined distance traveling is set as the automatic driving end point by the vehicle control device 17, and the "transition control mode" described above is executed, so that it is possible to obtain the same effect.

In other words, in a case where a failure occurs in a portion of the vehicle system and it is determined by the vehicle control device that it is difficult to continue the "automatic driving mode" for a long period of time, the "transition control mode" may be executed by setting the vehicle position after a predetermined time or after a predetermined distance travel as the automatic driving end point and determining the driving operation reliability of the driver by the driving operation reliability determinator.

Furthermore, in the present embodiment, the method has been proposed in which the rotational vibration of the steering wheel is detected as the steering angle of the steering angle sensor by the operation of the electric motor by the driving operation reliability determinator. However, the rotational vibration may be detected by using the steering torque detected by the torque sensor instead of the steering angle sensor. In this case, the decreased amount of the steering torque with respect to the amplitude of the steering torque value generated by the vibration of the steering device before the gripping of the steering wheel may be calculated as the driving operation reliability, and then, the same effect can be obtained.

Furthermore, in a case where the driving operation reliability is low in the determination of step S6 in FIG. 7, the process proceeds to step S10, and the vehicle is stopped on the road shoulder. However, in a case where it is determined that there is no other vehicle before and behind the vehicle and the safety can be secured, it may also be possible to stop the vehicle 1 at that place at the automatic driving end point.

Second Embodiment

Next, a second embodiment of the present invention will be described. The method of determining the driving operation reliability is different from that of the first embodiment, and the other configurations are similar to those of the first embodiment. The second embodiment of the present invention will be described with reference to FIG. 13. The configurations of the vehicle, the steering device, the vehicle control device, the steering control device, the steering reliability determinator, and the like are similar to those of the first embodiment, and thus, the description thereof is omitted. In addition, the control flow of the "transition control mode" of the steering control device is similar to that of FIG. 9, and thus, the description thereof is omitted.

FIG. 13 is a control flow of the vehicle control device in a case where the vehicle 1 approaches the automatic driving end point while traveling in the "automatic driving mode" of the vehicle, similarly to the first embodiment. Also in FIG. 13, the same control steps as in the control flow illustrated in FIG. 7 are affixed with the same reference numerals, and the description of the control steps having the same reference numerals is omitted.

In FIG. 13,

<<Step S0>>.

This step is similar to that in the first embodiment, and thus, the description thereof is omitted.

<<Step S1>>

This step is similar to that in the first embodiment, and thus, the description thereof is omitted.

<<Step S2>>

This step is similar to that in the first embodiment, and thus, the description thereof is omitted.

<<Step S3>>

This step is similar to that in the first embodiment, and thus, the description thereof is omitted.

<<Step S4>>

This step is similar to that in the first embodiment, and thus, the description thereof is omitted.

<<Step S5>>

This step is similar to that in the first embodiment, and thus, the description thereof is omitted. Then, when the control step of step S5 is executed, the process proceeds to step S13.

<<Step S13>>

In step S13, in a case where the vehicle 1 is traveling before the automatic driving end point, the driving operation reliability R is compared with the threshold value Rth in this step. In a case where the driving operation reliability R is less than the threshold value Rth, the processes from step S4 to step S5 are repeated until the manual driving of the driver can be permitted. On the other hand, in a case where the driving operation reliability is greater than the threshold value Rth, it is determined that the manual driving of the driver can be permitted, and the process proceeds to step S14.

<<Step S14>>

In step S14, when it is determined in step S13 that the driving operation reliability R is greater than the threshold value Rth, increment processing for incrementing the driving operation reliability pass count by 1 is executed. By this pass count, driving operation reliability can be quantified. Upon completion of the process of step S14, the process proceeds to step S15.

<<Step S15>>

In step S15, the traveling state of the vehicle 1 is continued while maintaining the "transition control mode" for a predetermined time after the execution of step S14. This is executed to determine whether or not the driving operation reliability R is continuously maintained. This is because, for example, even in a case where the driving operation reliability R has passed only once in steps S13 and S14, it is not always possible for the driver to reliably perform the manual driving again after that. Upon completion of the process of step S15, the process proceeds to step S6.

<<Step S6>>

This step is similar to that in the first embodiment, and thus, the description thereof is omitted. Then, when the control step of step S6 is executed, the process proceeds to step 16.

<<Step S16>>

Since it is determined in step 6 that the vehicle is traveling before the automatic driving end point, the vehicle is in a transition state according to the "transition control mode". In this state, in step S16, the pass count of the driving operation reliability R obtained in step S14 is compared with a preset threshold count N (3 to 5). In a case where the pass count of the driving operation reliability R is less than the threshold count N, steps S4, 5, 13, 14, 16, and 6 are repeated to determine the driving operation reliability. In a case where the pass count of the driving operation reliability R is equal to or greater than N, it is determined that the manual driving by the driver is sufficiently possible, and the process proceeds to step S8 and the following control steps are executed. If it is determined that the pass count exceeds the threshold count N in step S16, the pass count is cleared to "0".

<<Step S8>>

This step is similar to that in the first embodiment, and thus, the description thereof is omitted.

<<Step S9>>

This step is similar to that in the first embodiment, and thus, the description thereof is omitted.

<<Step S10>>

This step is similar to that in the first embodiment, and thus, the description thereof is omitted.

<<Step S11>>

This step is similar to that in the first embodiment, and thus, the description thereof is omitted.

<<Step S12>>:

This step is similar to that in the first embodiment, and thus, the description thereof is omitted.

According to this embodiment as well, similarly to the first embodiment, a transition control section in which the traveling by the transition control is performed is provided before the automatic driving end point, and the transition control from the automatic driving to the manual driving is executed in this section. The functions and effects obtained by the present embodiment are similar to those in the first embodiment, and thus, the description thereof is omitted.

In the present embodiment, since the vehicle is configured so as to perform the transition to the "manual driving mode" after the determination of the pass count of the driving operation reliability of the driver, it is possible to more accurately and reliably perform the reliability determination, and it is possible to more safe perform the transition of the vehicle from the "automatic driving mode" to the "manual driving mode".

In addition, in the control flow illustrated in FIG. 13, the example in which the transition to the "manual driving mode" is not performed unless the driving operation reliability R is greater than the threshold value Rth N or more than N times in step S110 has been described. However, the vehicle may be configured so as to immediately perform the transition to the "manual driving mode" in a case where the driver operates the automatic driving SW 31 to instruct the cancellation of the "automatic driving mode" while traveling in the state of the "transition control mode" only for a predetermined period of time in step S15.

Third Embodiment

Next, a third embodiment of the present invention will be described. Parameters used for determining the driving operation reliability are different from those in the first embodiment, and the other configurations are similar to those of the first embodiment. The second embodiment of the present invention will be described with reference to FIG. 14. The configurations of the vehicle, the steering device, the vehicle control device, the steering control device, the steering reliability determinator, and the like are similar to those of the first embodiment, and thus, the description thereof is omitted. In addition, since the control flow is the same as in the first embodiment or the second embodiment, the description thereof is omitted.

In the steering device 6 of FIG. 14, a gripping pressure sensor 201 is incorporated in the driver grip portion of the steering wheel 11, and the gripping pressure information 202 is input to the steering control device 10 as one of the steering information.

In the case of this configuration, in the driving operation reliability determination in step S4 of FIG. 7, the gripping pressure information 202 of the driver gripping the steering wheel 11 is detected, and the driving operation reliability R is determined by the magnitude of the gripping pressure 202. The case where there is no gripping pressure information 202 is a hands-free state where the driver releases the hands from the steering wheel 11, and the case where the gripping pressure information 202 is equal to or greater than a predetermined value is a state where the driver strongly grips the steering wheel 11.

For this reason, with respect to the driving operation reliability R, a value obtained by multiplying the gripping pressure information 202 by a constant gain Kp can be used as the driving operation reliability R. The "transition control mode" is executed by using the driving operation reliability R obtained from the gripping pressure information 202 similarly to the first embodiment, so that the same functions and effects as those of the first embodiment can be obtained, and safe transition from the "automatic driving mode" to the "manual driving mode" can be performed up to the automatic driving end point.

Furthermore, as a modification of the gripping pressure sensor 201, a pressure switch is provided in the grip portion. When the driver grips the pressure switch, a switch signal rises, and if the rising is detected, it is determined that the driving operation reliability is high. With such a configuration, the same functions and effects can be obtained.

Fourth Embodiment

Next, a fourth embodiment of the present invention will be described. Parameters used for determining the driving operation reliability are different from those in the first embodiment, and the other configurations are similar to those of the first embodiment. The second embodiment of the present invention will be described with reference to FIG. 14. The configurations of the vehicle, the steering device, the vehicle control device, the steering control device, the steering reliability determinator, and the like are similar to those of the first embodiment, and thus, the description thereof is omitted. In addition, the control flow is similar to that in the first embodiment or the second embodiment, and thus, the description thereof is omitted.

As illustrated in FIG. 15, the vehicle control device 17 is different from that of the first embodiment in that a driver state recognizing unit 301 is attached as an input unit and driver state information 302 is input. Herein, the driver state recognizing unit 301 is a sensor camera, a heart rate meter or the like for monitoring the behavior of the driver.

In this configuration, the driving operation reliability R is determined by using the driver state information 302 in the driving operation reliability determination in step S4 of FIG. 7. The driving operation reliability is determined, for example, by directly detecting from the image whether or not the driver opens the eyes or whether or not the driver grips the steering wheel or by estimating the tense state of the driver from a rise in the heart rate or the like.

Similarly to the first embodiment, control can be executed by using the driving operation reliability R obtained from the driver state information 302. In this case, with respect to this determination, since the driving operation reliability 39 is calculated by a reliability determining unit 40 of the vehicle control device 17, the determination by the vibration of the steering wheel 11 executed by the steering device 6 in the first embodiment may not be performed. For this reason, the steering reliability determinator 75 of the steering device 6 can use the value included in the steering control amount as it is.

In this embodiment as well, functions and effects similar to those of the first embodiment can be obtained, and safe transition from the "automatic driving mode" to the "manual driving mode" can be performed up to the automatic driving end point.

In addition, the present invention is not limited to the above-described embodiments, but the present invention includes various modified examples. For example, the above-described embodiments have been described in detail in order to explain the present invention in an easy-to-understand manner, and the present invention is not necessarily limited to those having all the configurations. Furthermore, a portion of the configuration of one embodiment can be replaced by the configuration of another embodiment, and the configuration of another embodiment can be added to the configuration of one embodiment. Furthermore, with respect to a portion of the configuration of each embodiment, addition of another configuration, deletion or replacement can be made.

REFERENCE SIGNS LIST

1: vehicle
2: vehicle position grasping unit
3: vehicle state recognizing unit
4: external world recognizing unit
5: drive unit
6: steering device
7: braking device
8: drive control device
9: accelerator pedal
10: steering control device
11: steering wheel
12: front wheel
13: rear wheel
14: brake control device
15: brake pedal
16: notifying unit
17: vehicle control device
36: automatic driving controller
38: manual driving controller
40: driving operation reliability determinator
42: transition controller
43: control selector
52: steering shaft
53: pinion axle
54: rack axle
55: tie rod
56: torque sensor
58: electric motor
59: output axle
60: deceleration mechanism
61: belt/pulley
62: ball screw
63: input terminal
64: output terminal
67: steering angle sensor
71: automatic steering controller
72: manual steering controller
75: steering reliability determinator
77: mixed steering controller
79: steering control selector
91: steering wheel vibration generation unit
92: steering wheel vibration estimation unit
93: steering reliability determination unit.

The invention claimed is:

1. A steering control system comprising:
a vehicle position grasping unit for recognizing a position of a vehicle;
a vehicle state recognizing unit for recognizing a traveling state of the vehicle;
an external world recognizing unit for recognizing an external environment of the vehicle;
a steering control device having an "automatic driving mode" function for executing an "automatic driving mode" for automatically controlling at least an actuator of a steering device of the vehicle based on the position of the vehicle, the traveling state, and the external environment and a "manual driving mode" function for executing a "manual driving mode" controlling the actuator of the steering device based on operation of a driver, and
a vehicle control device in communication with the steering control device, wherein the vehicle control device is configured to
determine whether or not it is necessary to perform a transition from the "automatic driving mode" to the "manual driving mode" during the "automatic driving mode";
set a transition period from the "automatic driving mode" to the "manual driving mode" if it is determined that it is necessary to perform the transition from the "automatic driving mode" to the "manual driving mode";
obtain a driving operation reliability of the driver as to whether or not it is possible to perform the transition to the "manual driving mode" during the transition period;
control a control amount to be applied to the actuator so as to perform the transition from the "automatic driving mode" to the "manual driving mode" in a case where it is determined that it is possible to perform the transition from the "automatic driving mode" to the "manual driving mode", and
change mixed steering torque information associated with the control amount in the case of the "automatic driving mode" and in the case of the "manual driving mode" according to a magnitude of the driving operation reliability.

2. The steering control system according to claim 1, wherein
vehicle control device is configured to determine the driving operation reliability of the driver before an end time point at which the "automatic driving mode" is ended.

3. The steering control system according to claim 2, wherein
an exit of an exclusive automobile road is defined as an end point with respect to the end time point, and
the vehicle control device is configured to determine the driving operation reliability of the driver within a predetermined distance from the exit.

4. The steering control system according to claim 1, wherein
in a case where it is determined by the vehicle control device that it is difficult to continue the "automatic driving mode", the vehicle control device sets the position of the vehicle after a predetermined period of time or after a predetermined distance of travel as the end time point of the "automatic driving mode", and determines the driving operation reliability of the driver within a period of time up to the end time point of the "automatic driving mode" after the predetermined period of time or the predetermined distance of travel.

5. A steering control system comprising:
a steering control device configured to
perform a manual steering control of an actuator turning wheels of a vehicle based on operation of a steering wheel by a driver in a "manual driving mode";
perform an automatic steering control of the actuator so as to correct a deviation when it is predicted that a traveling track or a traveling lane of the vehicle deviates from a target traveling track or a target traveling lane in the "automatic driving mode";
obtain a mixed control amount in which a control amount output from the manual steering control and a control amount output from the automatic steering control are mixed based on a manual operation contribution degree determined according to a magnitude of a determined driving operation reliability, and
apply the mixed control amount to the actuator in a case of performing a transition from the "automatic driving mode" to the "manual driving mode".

6. The steering control system according to claim 5, wherein
the vehicle control device is further configured to includes:
generate a rotational vibration on the steering wheel by applying a vibration generation signal to the actuator;
determine a vibration amplitude of the rotational vibration of the steering wheel; and
compare the vibration amplitude when the driver grips the steering wheel with the vibration amplitude when the driver does not grip the steering wheel and obtaining the driving operation reliability according to an attenuation amount of the vibration amplitude when the driver grips the steering wheel.

7. The steering control system according to claim 6, wherein the actuator from the vehicle control device is set is configured to set the vibration frequency applied to the actuator to a value greater than a natural frequency related to turning using the steering device.

8. The steering control system according to claim 6, wherein
the vibration amplitude of the vibration applied to the actuator from the vehicle control device is the vibration amplitude which does not affect the traveling track of the vehicle.

9. The steering control system according to claim 6, further comprising a steering angle sensor which detects a steering angle of the steering wheel or a torque sensor which detects a steering torque of the steering wheel.

10. The steering control system according to claim 1, wherein
vehicle control device determines that it is possible to perform the transition to the "manual driving mode" when it is detected that the driving operation reliability exceeds a predetermined driving operation reliability threshold value predetermined times during the transition period.

11. The steering control system according to claim 2, wherein
the end time point is an exit of an exclusive automobile road, and the vehicle control device determines the driving operation reliability of the driver within a section of a predetermined distance from the exit, on which the vehicle can perform straight traveling.

12. The steering control system according to claim 3, wherein
in a case where it is determined by the driving operation reliability vehicle control device that the driving operation reliability of the driver is low after reaching the end point, the vehicle control device continues the traveling of the vehicle in the "automatic driving mode".

13. The steering control system according to claim 3, wherein
in a case where it is determined by the vehicle control device that the driving operation reliability of the driver is low after reaching the end point, the traveling of the vehicle in the "automatic driving mode" is continued, and the vehicle is guided to a road shoulder and stopped by the "automatic driving mode".

14. The steering control system according to claim 1, wherein
the steering control device is configured to provide a notification to the driver to execute the "transition control mode" in a case where it is determined that it is necessary to perform the transition from the "automatic driving mode" to the "manual driving mode".

15. The steering control system according to claim 1, further comprising a driver state sensor for detecting a behavior of the driver, wherein the driving operation reliability is determined from the behavior of the driver detected by the driver state sensor.

16. A method of controlling a steering control system including a vehicle position grasping unit for recognizing a position of a vehicle, a vehicle state recognizing unit for recognizing a traveling state of the vehicle, and an external world recognizing unit for recognizing a surrounding environment of the vehicle; and a steering control device for executing an "automatic driving mode" for automatically controlling at least a steering device of the vehicle based on the position of the vehicle, the traveling state, and the surrounding environment and a "manual driving mode" under operation of a driver, wherein
the steering control device performs:
setting a transition period from the "automatic driving mode" to the "manual driving mode" in a case where it is determined that the transition from the "automatic driving mode" to the "manual driving mode" is necessary during the "automatic driving mode";
determining the driving operation reliability of the driver as to whether or not it is possible to perform the transition from the "automatic driving mode" to the "manual driving mode" during the transition period;
executing a transition control mode of permitting the transition from the "automatic driving mode" to the "manual driving mode" in a case where it is determined from the driving operation reliability that it is possible to perform the transition to the "manual driving mode";
controlling a control amount to be applied to an actuator so as to perform the transition from the "automatic driving mode" to the "manual driving mode" in a case where it is determined that it is possible to perform the transition from the "automatic driving mode" to the "manual driving mode"; and
changing mixed steering torque information associated with the control amount in the case of the "automatic driving mode" and in the case of the "manual driving mode" according to a magnitude of the driving operation reliability.

* * * * *